(12) United States Patent
Yamada

(10) Patent No.: US 8,996,298 B2
(45) Date of Patent: Mar. 31, 2015

(54) NOISE PATTERN ACQUISITION DEVICE AND POSITION DETECTION APPARATUS PROVIDED THEREWITH

(75) Inventor: Kazunori Yamada, Hyogo (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 171 days.

(21) Appl. No.: 13/882,828

(22) PCT Filed: May 29, 2012

(86) PCT No.: PCT/JP2012/003500
§ 371 (c)(1),
(2), (4) Date: May 1, 2013

(87) PCT Pub. No.: WO2012/172741
PCT Pub. Date: Dec. 20, 2012

(65) Prior Publication Data
US 2013/0218451 A1     Aug. 22, 2013

(30) Foreign Application Priority Data

Jun. 13, 2011    (JP) .................... 2011-131653

(51) Int. Cl.
*G01C 21/08* (2006.01)
*G01C 21/00* (2006.01)
*G01C 21/20* (2006.01)

(52) U.S. Cl.
CPC ............ *G01C 21/005* (2013.01); *G01C 21/206* (2013.01); *G01C 21/08* (2013.01)
USPC ........... 701/409; 701/408; 701/505; 701/518; 701/525

(58) Field of Classification Search
CPC ...... G01C 17/38; G01C 21/165; G01C 21/08; G01S 19/48; G01S 19/49
USPC ........ 701/408, 409, 500, 501, 504, 505, 518, 701/525
See application file for complete search history.

(56) References Cited

U.S. PATENT DOCUMENTS 5,297,050 A * 3/1994 Ichimura et al. ............... 701/445
8,438,127 B2 * 5/2013 Kurata et al. ................... 706/48
(Continued)

FOREIGN PATENT DOCUMENTS

JP      63-172917        7/1988
JP      63172917 A *     7/1988
(Continued)

OTHER PUBLICATIONS

Haverinen et al., Global indoor self-localization based on the ambient magnetic field, 2009, Robotics and Autonomous Systems 57.*
(Continued)

*Primary Examiner* — Thomas G Black
*Assistant Examiner* — Sara Nelson
(74) *Attorney, Agent, or Firm* — Wenderoth, Lind & Ponack, L.L.P.

(57) ABSTRACT

A noise pattern acquisition device includes: a geomagnetic sensor; a coordinate estimation unit configured to estimate current position coordinates; and a geomagnetic noise pattern management unit configured to, when an abnormality occurs in a magnetic field strength detected by the geomagnetic sensor during movement of the noise pattern acquisition device, store in a geomagnetic noise pattern storage unit a geomagnetic noise pattern which is a pattern representing a time-series change of the magnetic field strength detected by the geomagnetic sensor. This makes it possible to not only acquire a geomagnetic noise pattern but also detect a proper position with a simple structure and process at reduced cost.

18 Claims, 15 Drawing Sheets

(56) References Cited

U.S. PATENT DOCUMENTS

| | | | |
|---|---|---|---|
| 2003/0187922 A1* | 10/2003 | Ohara | 709/203 |
| 2009/0043504 A1* | 2/2009 | Bandyopadhyay et al. | 701/213 |
| 2011/0062947 A1* | 3/2011 | Favre-Reguillon et al. | 324/207.11 |
| 2011/0172918 A1* | 7/2011 | Tome | 701/220 |
| 2013/0211713 A1* | 8/2013 | Georgy et al. | 701/468 |

FOREIGN PATENT DOCUMENTS

| | | | |
|---|---|---|---|
| JP | 4-172216 | | 6/1992 |
| JP | 04172216 A | * | 6/1992 |
| JP | 2003-296273 | | 10/2003 |
| JP | 2005-300896 | | 10/2005 |
| JP | 2007-43316 | | 2/2007 |
| JP | 2007-304787 | | 11/2007 |
| JP | 2008-70236 | | 3/2008 |
| JP | 2009-229295 | | 10/2009 |
| WO | 2007/069323 | | 6/2007 |

OTHER PUBLICATIONS

Extended European Search Report issued Nov. 5, 2014 in corresponding European Application No. 12800353.0.

Ilari Vallivaara et al., "Simultaneous Localization and Mapping Using Ambient Magnetic Field", 2010 IEEE International Conference on Multisensor Fusion and Integration for Intelligent Systems, Sep. 5, 2010, pp. 14-19, XP031777457.

Janne Haverinen et al., "Global indoor self-localization based on the ambient magnetic field", Robotics and Autonomous Systems, Elsevier Science Publishers, Amsterdam, NL, vol. 57, No. 10, Oct. 31, 2009, pp. 1028-1035, XP026614193.

International Search Report issued Jul. 31, 2012 in corresponding International Application No. PCT/JP2012/003500.

Reply to Written Opinion issued Jul. 31, 2012 in corresponding International Application No. PCT/JP2012/003500 (with English translation).

* cited by examiner

FIG. 2

| Reference point ID | Reference noise pattern | Reference coordinates | Reference accuracy | Update time |
|---|---|---|---|---|
| p1 | Reference noise pattern 1 | X2, Y2, Z2 | 60% | 20000202:22:10:05 |
| p2 | Reference noise pattern 2 | X3, Y3, Z3 | 80% | 20030303:23:13:03 |

Table 109a

FIG. 10

| Reference point ID | Reference noise pattern | Reference coordinates | Reference accuracy | Movement velocity | Update time |
|---|---|---|---|---|---|
| p1 | Reference noise pattern 1 | X2, Y2, Z2 | 60% | 1.5m/sec | 20000202:22:10:05 |
| p2 | Reference noise pattern 2 | X3, Y3, Z3 | 80% | 1m/sec | 20030303:23:13:03 |

Table 109b

FIG. 11

| Reference point ID | Reference noise pattern | Reference coordinates | Reference accuracy | Update time |
|---|---|---|---|---|
| p1 | Reference noise pattern 1a<br>Reference noise pattern 1b | X2, Y2, Z2 | 60% | 20000202:22:10:05<br>20000205:10:10:03 |
| p2 | Reference noise pattern 2b | X3, Y3, Z3 | 80% | 20030303:23:13:03 |

Table 109c

FIG. 13

| Reference point ID | Reference noise pattern | Type | Reference coordinates | Reference accuracy | Update time |
|---|---|---|---|---|---|
| p1 | Reference noise pattern 1 | Disturbed | X2, Y2, Z2 | 60% | 20000202:22:10:05 |
| p2 | Reference noise pattern 2 | Steady | X3, Y3, Z3 | 80% | 20030303:23:13:03 |

Table 109d

NOISE PATTERN ACQUISITION DEVICE AND POSITION DETECTION APPARATUS PROVIDED THEREWITH

TECHNICAL FIELD

The present invention relates to devices and so on which acquire a noise pattern, and relates in particular to a noise pattern acquisition device and a position detection apparatus provided therewith and so on which are included in a mobile terminal and detect an indoor position of the mobile terminal.

BACKGROUND ART

With recent home networks, there has been a progress in the introduction of home appliance coordination whereby various home appliances are connected to a network. This progress has been achieved by, in addition to coordination of AV appliances through Internet Protocol (IP) connection by Ethernet (registered trademark) or wireless Local Area Network (LAN), the Home Energy Management System (HEMS) which has a function to manage power consumption for addressing environmental issues and to turn on/off the appliances through an operation outside home. Detection of the user position in controlling the home appliances through such home appliance coordination allows the home appliances to be controlled according to the user position. As a result, improvement is expected in the operability and the accuracy of the control over the home appliances.

It is often the case that the Global Positioning System (GPS) function cannot be used for detecting an indoor position. In view of this, a position detection apparatus has been introduced in recent years which detects its position using a GPS antenna intended for indoor use (indoor GPS antenna). Furthermore, a position detection apparatus has also been introduced which captures radio waves of plural wireless LANs and estimates its position based on the strength and so on of the radio waves.

Moreover, a mobile robot has been proposed which includes a position detection apparatus that detects its indoor position by autonomous navigation (e.g. see Patent Literature (PTL) 1).

CITATION LIST

Patent Literature

[PTL 1] Japanese Unexamined Patent Application Publication No. 2008-70236

SUMMARY OF INVENTION

Technical Problem

The above conventional techniques, however, have a problem that it takes a trouble when the apparatus detects its position.

The present invention has been conceived in view of this problem, and an object is to provide a noise pattern acquisition device and a position detection apparatus provided therewith which can detect a proper position with a simple structure and process.

Solution to Problem

To achieve the above object, a noise pattern acquisition device according to a first aspect of the present invention includes: a geomagnetic sensor; a coordinate estimation unit configured to estimate current position coordinates representing a current position of the noise pattern acquisition device; and a geomagnetic noise pattern management unit configured to, when an abnormality occurs in a magnetic field strength detected by the geomagnetic sensor during movement of the noise pattern acquisition device, store a geomagnetic noise pattern in a recording medium in association with the current position coordinates estimated by the coordinate estimation unit when the abnormality occurs, the geomagnetic noise pattern being a pattern representing a time-series change of the magnetic field strength detected by the geomagnetic sensor.

Note that these general or specific aspects may be implemented using a system, a method, an integrated circuit, a computer program, or a recording medium, or any combination of systems, methods, integrated circuits, computer programs, or recording media.

Advantageous Effects of Invention

According to the present invention, it is possible to acquire a geomagnetic noise pattern, and detect a proper position with a simple structure and process using the geomagnetic noise pattern obtained. This contributes to cost reduction. More specifically, it is possible to configure the system inexpensively and easily without requiring an indoor GPS antenna or a pre-registered specific object serving as a reference point.

BRIEF DESCRIPTION OF DRAWINGS

FIG. 1 is a functional block diagram of a position detection apparatus according to an embodiment of the present invention.

[FIG. 2]
FIG. 2 is a diagram showing a table in a geomagnetic noise pattern storage unit according to an embodiment of the present invention.

FIG. 3 is a diagram showing an example of geomagnetic noise occurrence areas in a home according to an embodiment of the present invention.

FIG. 4 is a diagram showing an example of an occurring geomagnetic noise pattern according to an embodiment of the present invention.

FIG. 5 is a flowchart showing flow of a process relating to coordinate estimation by a position detection apparatus according to an embodiment of the present invention.

FIG. 6 is a flowchart showing flow of a process by a terminal posture detection unit according to an embodiment of the present invention.

FIG. 7 is a flowchart showing flow of a process by a geomagnetic noise detection unit according to an embodiment of the present invention.

FIG. 8 is a flowchart showing flow of a process by a geomagnetic noise pattern management unit according to an embodiment of the present invention.

FIG. 9 is a flowchart showing a position detection method according to an embodiment of the present invention.

[FIG. 10]

FIG. 10 is a diagram showing a table in a geomagnetic noise pattern storage unit according to Variation 1 of an embodiment of the present invention.

[FIG. 11]

FIG. 11 is a diagram showing a table in a geomagnetic noise pattern storage unit according to Variation 2 of an embodiment of the present invention.

FIG. 12 is a diagram showing an example of an occurring geomagnetic noise pattern according to Variation 3 of an embodiment of the present invention.

[FIG. 13]

FIG. 13 is a diagram showing a table in a geomagnetic noise pattern storage unit according to Variation 3 of an embodiment of the present invention.

FIG. 14 is a functional block diagram of a noise pattern acquisition device according to Variation 4 of an embodiment of the present invention.

FIG. 15 is a flowchart showing flow of a process by a noise pattern acquisition device according to Variation 4 of an embodiment of the present invention.

Figure 1:
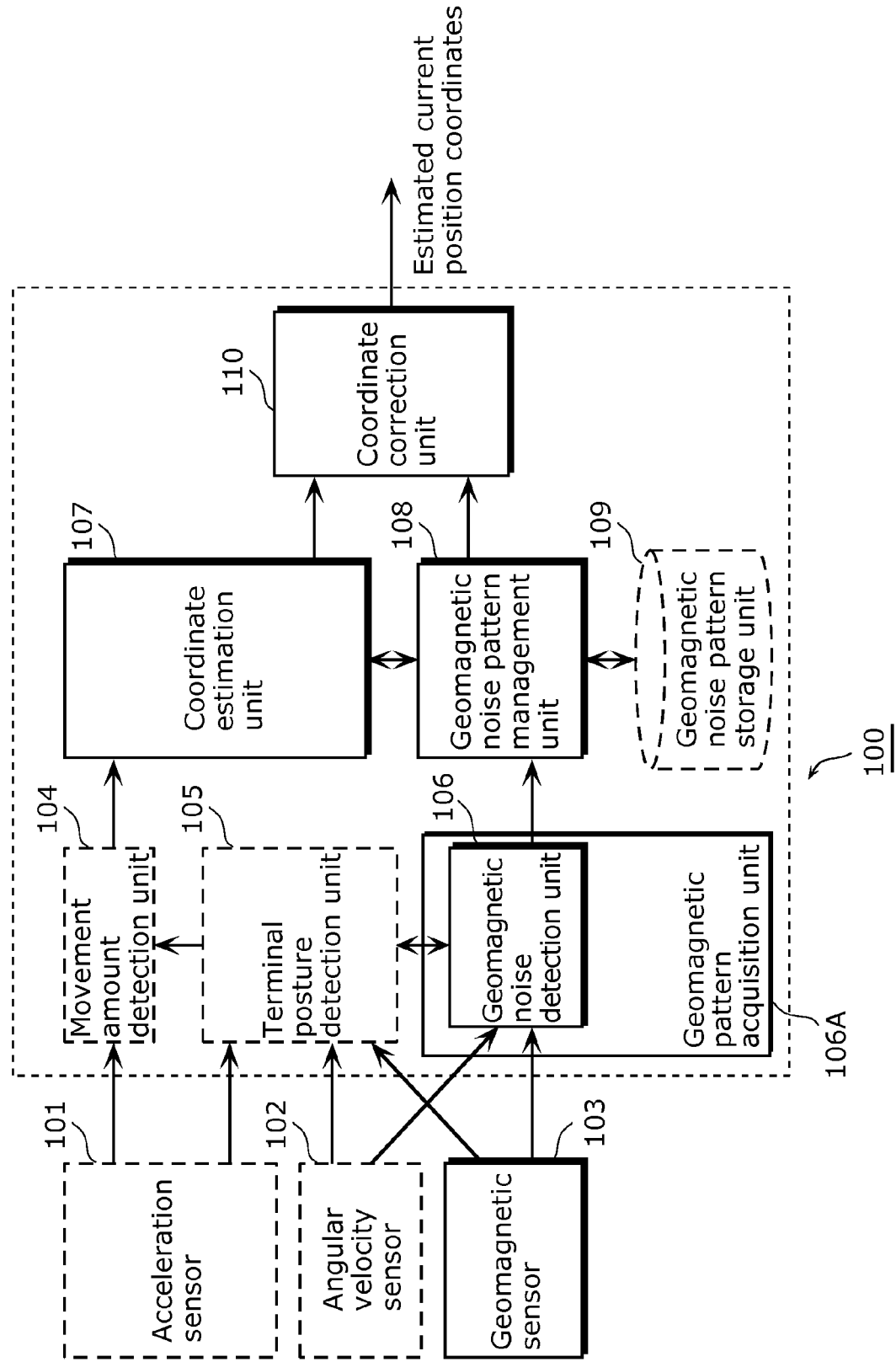
[FIG. 1]

DESCRIPTION OF EMBODIMENTS (Underlying Knowledge Forming Basis of the Present Invention)

The inventor of the present application has found the problem below in relation to the technique of PTL 1 mentioned in [Background Art] above.

The position detection apparatus which estimates its position using the GPS antenna intended for indoor use (indoor GPS antenna) requires information on the indoor GPS antenna and on the base station. This complicates the configuration of the system that detects the position, thereby increasing the burden on the user when using the position detection apparatus. For example, the position detection apparatus using the indoor GPS antenna requires the user to provide the position detection apparatus with the position of the indoor GPS antenna when installing the indoor GPS antenna. Similarly, the position detection apparatus using wireless LANs requires the user to pre-register the position of the base station in the position detection apparatus.

To address such a problem, PTL 1 has proposed a mobile robot which includes a position detection apparatus that detects its indoor position by autonomous navigation. This position detection apparatus determines its first indoor position as initial coordinates in advance. When the position detection apparatus moves from the initial coordinates, the position detection apparatus detects its post-movement position based on output (information) from a sensor included in itself and the initial coordinates. By having a camera, and with the pre-registration of the shape and position of a ventilation port serving as the reference point, the position detection apparatus resets its detected position to the pre-registered position of the ventilation port (reference point) when the camera finds the ventilation port. This enables correction of error in positions cumulatively detected based on the output from the sensor and the initial coordinates.

However, the position detection apparatus included in the mobile robot according to PTL 1 requires a complicated structure and process, thereby entailing a high cost. More specifically, the position detection apparatus according to PTL 1 requires a camera for finding the ventilation port, and further requires pre-registration of the shape of the ventilation port and pattern matching between an image captured by the camera and the pre-registered shape of the ventilation port. This increases the cost. Furthermore, since the shape of the ventilation port needs to be pre-registered, it takes a trouble in using the position detection apparatus in an environment, such as inside a home, forming a diverse space depending on the user.

In view of this, an aspect of the present invention has been conceived in view of the above problems, and an object is to provide a noise pattern acquisition device and a position detection apparatus provided therewith which can detect a proper position with a simple structure and process.

To achieve the above object, a noise pattern acquisition device according to a first aspect of the present invention includes: a geomagnetic sensor; a coordinate estimation unit configured to estimate current position coordinates representing a current position of the noise pattern acquisition device; and a geomagnetic noise pattern management unit configured to, when an abnormality occurs in a magnetic field strength detected by the geomagnetic sensor during movement of the noise pattern acquisition device, store a geomagnetic noise pattern in a recording medium in association with the current position coordinates estimated by the coordinate estimation unit when the abnormality occurs, the geomagnetic noise pattern being a pattern representing a time-series change of the magnetic field strength detected by the geomagnetic sensor.

A noise pattern acquisition device according to a second aspect of the present invention may be, in the first aspect, a noise pattern acquisition device further including, for example, a geomagnetic noise detection unit configured to detect a time period during which the pattern representing the time-series change of the magnetic field strength detected by the geomagnetic sensor during movement of the noise pattern acquisition device is different from a standard pattern, as a time period during which an abnormality occurs in the magnetic field strength.

A noise pattern acquisition device according to a third aspect of the present invention may be, in the first aspect, a noise pattern acquisition device further including, for example, a geomagnetic noise detection unit configured to detect a time period during which an amount of change in the magnetic field strength of geomagnetism detected by the geomagnetic sensor is greater than or equal to a predetermined amount, as a time period during which an abnormality occurs in the magnetic field strength.

A noise pattern acquisition device according to a fourth aspect of the present invention may be, in any one of the first to third aspects, a noise pattern acquisition device further including, for example, a geomagnetic pattern acquisition unit configured to acquire a geomagnetic pattern that is a pattern representing a time-series change of the magnetic field strength detected by the geomagnetic sensor during movement of the noise pattern acquisition device.

A noise pattern acquisition device according to a fifth aspect of the present invention may be, in any one of the first to fourth aspects, a noise pattern acquisition device wherein, for example, the geomagnetic noise pattern management unit is configured to: search the recording medium in which one or more patterns are stored, for a correction reference noise pattern that is (i) associated with coordinates near processing-target current position coordinates estimated by the coordinate estimation unit when the abnormality occurs and (ii) similar to the geomagnetic noise pattern, the processing-target current position coordinates being the current position coordinates to be processed; store the processing-target current position coordinates and the geomagnetic noise pattern in the recording medium in association with each other when the correction reference noise pattern is not found through the search; and instruct correction of the processing-target current position coordinates when the correction reference noise pattern is found through the search, and the noise pattern acquisition device further includes a coordinate correction unit configured to correct the processing-target current position coordinates to coordinates stored in the recording medium in association with the correction reference noise pattern, according to the correction instruction by the geomagnetic noise pattern management unit.

A position detection apparatus according to a sixth aspect of the present invention may be, for example, a position detection apparatus including the noise pattern acquisition device according to the fifth aspect, wherein the position detection apparatus detects a position of the position detection apparatus after movement as the current position coordinates, by estimating coordinates indicating the position of the position detection apparatus after movement.

With this, the geomagnetic noise pattern is generated while there is an abnormality in the geomagnetic detection by the geomagnetic sensor. When a correction reference noise pattern similar to the geomagnetic noise pattern is found in the recording medium, the processing-target current position coordinates estimated when there is an abnormality are corrected to the coordinates (reference coordinates) stored in the recording medium in association with the correction reference noise pattern. The geomagnetic noise pattern has repeatability, and therefore, if the reference coordinates are accurate, the processing-target current position coordinates can be corrected to proper coordinates based on the geomagnetic noise pattern. Moreover, the search for the correction reference noise pattern is search for a correction reference noise pattern which is associated with coordinates near the processing-target current position coordinates. Thus, it is possible to prevent wrong correction of the processing-target current position coordinates to distant coordinates. Here, coordinates within a predetermined distance from the processing-target current position coordinates may be treated as coordinates near the processing-target current position coordinates.

The process performed by the position detection apparatus according to the sixth aspect of the present invention to derive proper coordinates, i.e. coordinates after the correction, is merely the search for a correction reference noise pattern similar to the geomagnetic noise pattern. More specifically, the geomagnetic noise pattern is compared with one or more patterns stored in the recording medium. Therefore, the position detection apparatus according to an aspect of the present invention does not need the camera required in PTL 1, nor image processing for pattern matching between an image captured by the camera and the shape of a ventilation port. As a result, a proper position can be detected with a simple structure and process, contributing to reduced cost.

When the correction reference noise pattern is not found, the position detection apparatus according to the sixth aspect of the present invention stores the processing-target current position coordinates and the geomagnetic noise pattern in the recording medium in association with each other. This saves the user a trouble of storing combinations of the coordinates and the pattern in the recording medium, and a database indicating such combinations can be automatically created. Thus, the position detection apparatus provides improved convenience even in an environment, such as inside a home, forming a diverse space depending on the user.

A position detection apparatus according to a seventh aspect of the present invention may be, in the sixth aspect, for example, a position detection apparatus further including: an acceleration sensor; a posture detection unit configured to detect a posture of the position detection apparatus based on detection results of the acceleration sensor and the geomagnetic sensor; and a movement amount detection unit configured to detect a movement amount indicating a movement direction and a movement distance of the position detection apparatus, based on the posture detected by the posture detection unit and the detection result of the acceleration sensor, wherein the coordinate estimation unit is configured to estimate, as the current position coordinates, coordinates away from previously estimated coordinates by the movement amount detected by the movement amount detection unit.

With this, the current position coordinates are detected as the current position of the position detection apparatus based on the detection results of the acceleration sensor, the geomagnetic sensor, the posture detection unit, and the movement amount detection unit. More specifically, the current position of the position detection apparatus is detected by autonomous navigation. As a result, the current position of the position detection apparatus can be accurately detected, and this position can be corrected to a more proper position.

A position detection apparatus according to an eighth aspect of the present invention may be, in the sixth or seventh aspect, for example, a position detection apparatus further including an angular velocity sensor, wherein the geomagnetic noise detection unit is configured to detect whether or not an abnormality occurs in geomagnetic detection, by comparing an amount of change in orientation of the position detection apparatus detected by the angular velocity sensor and an amount of change in orientation of the position detection apparatus derived based on a change in the magnetic field strength detected by the geomagnetic sensor.

It is detected that there is an abnormality in the geomagnetic detection when, for example, there is a difference of a predetermined amount or ratio or greater between the amount of change in the orientation of the position detection apparatus detected by the angular velocity sensor and the amount of change in the orientation of the position detection apparatus derived based on the change in the magnetic field strength detected by the geomagnetic sensor. This can prevent false detection in determining whether or not there is an abnormality in the geomagnetic detection. There is a case where the magnetic field strength (magnetic field strength in each of the X-axis direction, the Y-axis direction, and the Z-axis direction, for example) detected by the geomagnetic sensor changes according to a change in orientation of the position detection apparatus. In such a case, it is possible to prevent wrong determination that there is an abnormality in the geomagnetic detection due to a change in the magnetic field strength.

Typically, when a magnetic field strength different from a magnetic field strength logically derived according to the latitude and the longitude of a specific position or location is detected, it is detected that there is an abnormality in the geomagnetic detection in the specific position or location. Conversely, when a magnetic field strength substantially equal to the logically-derived magnetic field strength is detected, it is detected that there is no abnormality in the geomagnetic detection in the specific position or location. However, there is a special case where, even if a magnetic field unrelated to geomagnetism is present near the position detection apparatus, a magnetic field strength substantially equal to the logically-derived magnetic field strength is detected as a result of a change in orientation of the position detection apparatus. In such a special case, an occurrence of an abnormality in the geomagnetic detection should be detected. In view of this, a comparison is made between the amount of change in the orientation of the position detection apparatus detected by the angular velocity sensor and the amount of change in the orientation of the position detection apparatus derived based on the change in the magnetic field strength detected by the geomagnetic sensor. As a result, an occurrence of an abnormality in the geomagnetic detection can be appropriately detected even in such a special case. In detail, in the above-mentioned special case, there is a difference between the amount of change in the orientation of the position detection apparatus detected by the angular velocity sensor and the amount of change in the orientation of the position detection apparatus derived based on the change in the magnetic field strength detected by the geomagnetic sensor. Accordingly, an occurrence of an abnormality in the geomagnetic detection can be detected when this difference is greater than a threshold, for example.

A position detection apparatus according to a ninth aspect of the present invention may be, in the seventh aspect, for example, a position detection apparatus wherein the movement amount detection unit is configured to further detect a movement velocity of the position detection apparatus based on the detection result of the acceleration sensor, when searching for the correction reference noise pattern, the geomagnetic noise pattern management unit is configured to (i) scale a comparison-target pattern stored in the recording medium, according to a ratio between a movement velocity stored in the recording medium in association with the comparison-target pattern and the movement velocity detected by the movement amount detection unit when the abnormality occurs, to match a time-axis scale of the comparison-target pattern with a time-axis scale of the geomagnetic noise pattern, and (ii) perform pattern matching between the geomagnetic noise pattern and the scaled comparison-target pattern to determine whether or not the comparison-target pattern is the correction reference noise pattern, the comparison-target pattern being a pattern to be compared with the geomagnetic noise pattern, and when the correction reference noise pattern is not found through the search, the geomagnetic noise pattern management unit is configured to store the movement velocity detected by the movement amount detection unit when the abnormality occurs, in the recording medium in association with the processing-target current position coordinates and the geomagnetic noise pattern.

For example, the geomagnetic noise pattern is generated by detecting the magnetic field strength at predetermined sampling intervals. In this case, if the movement velocity of the position detection apparatus differs when the position detection apparatus repeatedly passes the same position, the generated geomagnetic noise pattern will end up being different. Accordingly, the position detection apparatus according to an aspect of the present invention scales the comparison-target pattern so that the time-axis scale of the comparison-target pattern stored in the recording medium matches the time-axis scale of the geomagnetic noise pattern. This makes it possible to search for an appropriate correction reference noise pattern. In the case where the correction reference noise pattern is not found, the movement velocity is also stored in the recording medium in association with, for example, the processing-target current position coordinates. This allows easy acquisition and use of the movement velocity required for the scaling.

A position detection apparatus according to a tenth aspect of the present invention may be, in the seventh aspect, for example, a position detection apparatus wherein the movement amount detection unit is configured to further detect a movement velocity of the position detection apparatus based on the detection result of the acceleration sensor, when searching for the correction reference noise pattern, the geomagnetic noise pattern management unit is configured to (i) scale the geomagnetic noise pattern according to a ratio between a predetermined movement velocity and the movement velocity detected by the movement amount detection unit when the abnormality occurs, to match a time-axis scale of the geomagnetic noise pattern with a time-axis scale of a comparison-target pattern stored in the recording medium, and (ii) perform pattern matching between the scaled geomagnetic noise pattern and the comparison-target pattern to determine whether or not the comparison-target pattern is the correction reference noise pattern, the comparison-target pattern being a pattern to be compared with the geomagnetic noise pattern, and when the correction reference noise pattern is not found through the search, the geomagnetic noise pattern management unit is configured to store the scaled geomagnetic noise pattern in the recording medium.

With this, the geomagnetic noise pattern is scaled so that the time-axis scale of the comparison-target pattern stored in the recording medium matches the time-axis scale of the geomagnetic noise pattern. This makes it possible to search for an appropriate correction reference noise pattern. In the case where the correction reference noise pattern is not found, the geomagnetic noise pattern scaled based on the predetermined movement velocity is stored in the recording medium. Since there is no need to store in the recording medium the movement velocity detected when there is an abnormality in the geomagnetic detection, the storage capacity of the recording medium can be saved.

A position detection apparatus according to an eleventh aspect of the present invention may be, in any one of the sixth to tenth aspects, for example, a position detection apparatus wherein the coordinate estimation unit is further configured to calculate current position accuracy indicating accuracy of the current position coordinates, according to at least one of: a distance of movement of the position detection apparatus from coordinates of a reference point; complexity of the movement of the position detection apparatus from the coordinates of the reference point; and a time period required for the movement of the position detection apparatus from the coordinates of the reference point, the reference point being a point by which the position detection apparatus has most recently passed and whose position is already identified, when the correction reference noise pattern is not found through the search, the geomagnetic noise pattern management unit is configured to store current position accuracy calculated for the processing-target current position coordinates, in the recording medium in association with the processing-target current position coordinates and the geomagnetic noise pattern, and when the correction reference noise pattern is found through the search, the geomagnetic noise pattern management unit is configured to (i) compare the current position accuracy calculated for the processing-target current position coordinates and accuracy stored in the recording medium in association with the correction reference noise pattern, and (ii) instruct the coordinate correction unit to correct the processing-target current position coordinates when the accuracy stored in the recording medium is higher than the current position accuracy.

For example, lower current position accuracy is calculated when the distance by which the position detection apparatus has moved from the reference point is longer. Thus, when the correction reference noise pattern is found, the processing-target current position coordinates are corrected in the case where the accuracy (reference accuracy) associated with the correction reference noise pattern is higher than the current position accuracy. This prevents correction of the current position coordinates even when the accuracy of the coordinates stored in the recording medium in association with the correction reference noise pattern is equal to or lower than the accuracy of the current position coordinates. As a result, a more proper position can be detected.

A position detection apparatus according to a twelfth aspect of the present invention may be, in the eleventh aspect, for example, a position detection apparatus wherein the geomagnetic noise pattern management unit is configured to replace the coordinates and the accuracy stored in the recording medium in association with the correction reference noise pattern, with the processing-target current position coordinates and the current position accuracy, respectively, when the accuracy stored in the recording medium is equal to or lower than the current position accuracy.

This increases the accuracy of the coordinates stored in the recording medium.

A position detection apparatus according to a thirteenth aspect of the present invention is, in any one of the sixth to twelfth aspects, for example, a position detection apparatus wherein the geomagnetic noise pattern management unit is configured to search for the correction reference noise pattern based on (i) a similarity between each of one or more patterns stored in the recording medium and the geomagnetic noise pattern and (ii) a distance between each set of the coordinates stored in the recording medium in association with the one or more patterns and the processing-target current position coordinates.

For example, a pattern having a high similarity and corresponding to a short distance is searched for as the correction reference noise pattern. This makes it possible to search for a more appropriate correction reference noise pattern, thus enabling detection of a more proper position.

A position detection apparatus according to a fourteenth aspect of the present invention is, in any one of the sixth to thirteenth aspects, for example, a position detection apparatus wherein when the correction reference noise pattern is found through the search, the geomagnetic noise pattern management unit is configured to store the geomagnetic noise pattern in the recording medium to associate the correction reference noise pattern and the geomagnetic noise pattern with same coordinates, and when the geomagnetic noise detection unit generates a next geomagnetic noise pattern, the geomagnetic noise pattern management unit is configured to search the recording medium in which plural patterns are stored, for a correction reference noise pattern corresponding to the next geomagnetic noise pattern, the plural patterns including the correction reference noise pattern and the geomagnetic noise pattern which are associated with the same coordinates.

With this, plural patterns are stored in the recording medium in association with the same coordinates, and thus it is possible to increase the probability of correcting the processing-target current position coordinates to those same coordinates. As a result, a more proper position can be detected.

A position detection apparatus according to a fifteenth aspect of the present invention is, in any one of the sixth to fourteenth aspects, for example, a position detection apparatus wherein when searching for the correction reference noise pattern, the geomagnetic noise pattern management unit is configured to specify a type of the geomagnetic noise pattern, and when the specified type indicates that the magnetic field strength is disturbed, search for a pattern stored in the recording medium in association with the type indicating the disturbance, as the correction reference noise pattern, and when the correction reference noise pattern is not found through the search, the geomagnetic noise pattern management unit is configured to store the type indicating the disturbance in the recording medium in association with the processing-target current position coordinates and the geomagnetic noise pattern.

With this, when the type of the geomagnetic noise pattern indicates the disturbance, the pattern stored in the recording medium in association with the type indicating the disturbance is searched for as the correction reference noise pattern. Thus, it is possible to easily search for the correction reference noise pattern without performing pattern matching. This contributes to both reduced computation required for the search for the correction reference noise pattern, and improved position detection accuracy.

Note that these general or specific aspects may be implemented using a system, a method, an integrated circuit, a computer program, or a recording medium, or any combination of systems, methods, integrated circuits, computer programs, or recording media.

For example, the present invention can be implemented not only as the position detection apparatus including the noise pattern acquisition device, but also as a method of position detection to be performed by the position detection apparatus, a program for causing a computer to perform position detection using that method, a recording medium having that program stored therein, and an integrated circuit.

The following describes an embodiment according to the present invention with reference to the drawings.

Note that the embodiment described below shows one specific example of the present invention. The numerical values, shapes, materials, structural elements, the arrangement and connection of the structural elements, steps, the processing order of the steps, etc., shown in the following embodiment are mere examples, and are therefore not intended to limit the present invention. Furthermore, among the structural elements in the embodiment described below, structural elements not recited in any of the independent claims indicating the most generic concepts are described as arbitrary structural elements.

(Embodiment)

FIG. 1 is a functional block diagram of a position detection apparatus according to an embodiment of the present invention. A position detection apparatus 100 is fixed to a mobile terminal, and detects a position of the position detection apparatus 100 as a position of the mobile terminal. As shown in FIG. 1, the position detection apparatus 100 includes an acceleration sensor 101, an angular velocity sensor 102, a geomagnetic sensor 103, a movement amount detection unit 104, a terminal posture detection unit 105, a geomagnetic noise detection unit 106, a coordinate estimation unit 107, a geomagnetic noise pattern management unit 108, a geomagnetic noise pattern storage unit 109, and a coordinate correction unit 110.

Since the position detection apparatus 100 is fixed to the mobile terminal, the states of the mobile terminal such as position, orientation, tilt, acceleration, acceleration direction, movement direction, movement distance, rotation direction, angular velocity, and the like are the same as the states of the position detection apparatus 100. The geomagnetic noise detection unit 106 is included in a geomagnetic pattern acquisition unit 106A.

The acceleration sensor 101 detects a direction and a magnitude of a force such as gravity and inertial force acting on the acceleration sensor 101, in a local coordinate system (three-axis coordinate system of X, Y, and Z axes) fixed to the position detection apparatus 100. For example, in the case where the position detection apparatus 100 or the mobile terminal is shaped long in one direction, the longitudinal direction of the position detection apparatus 100 or the mobile terminal is the Z-axis direction. The directions perpendicular to the Z axis and orthogonal to each other are the X-axis direction and the Y-axis direction. The acceleration sensor 101 performs the above-mentioned detection and outputs acceleration information indicating the detection result, at predetermined time intervals.

The angular velocity sensor 102 detects a rotation direction and an angular velocity of the mobile terminal, at predetermined time intervals.

The geomagnetic sensor 103 detects a magnetic field strength in the local coordinate system at predetermined time intervals. In detail, the geomagnetic sensor 103 detects a magnetic field strength in each of the X-axis direction, the Y-axis direction, and the Z-axis direction. A magnetic field (geomagnetism) in the position of the mobile terminal is expressed as one magnetic field vector, based on these magnetic field strengths of the three axes.

The terminal posture detection unit 105 calculates (detects), at predetermined time intervals, an orientation (posture) of the mobile terminal with respect to the earth, based on the detection results of the acceleration sensor 101, the angular velocity sensor 102, and the geomagnetic sensor 103. The posture includes a tilt of the mobile terminal with respect to a horizontal plane and an orientation of the mobile terminal on the horizontal plane.

The movement amount detection unit 104 calculates (detects), at predetermined time intervals, a movement direction, a movement velocity, and a movement distance of the mobile terminal in a global coordinate system fixed to the earth, based on the posture calculated by the terminal posture detection unit 105 and the acceleration information outputted from the acceleration sensor 101. Otherwise, the movement amount detection unit 104 calculates (detects), at predetermined time intervals, a movement direction, a movement velocity, and a movement distance of the mobile terminal in a home coordinate system fixed to the inside of the home, based on the posture calculated by the terminal posture detection unit 105 and the acceleration information outputted from the acceleration sensor 101. Hereafter, a parameter indicating the movement direction and the movement distance is referred to as a movement amount.

The geomagnetic pattern acquisition unit 106A includes the geomagnetic noise detection unit 106, and acquires a geomagnetic pattern that is a time-series pattern of the magnetic field strength detected by the geomagnetic sensor 103 during movement of the mobile terminal.

The geomagnetic noise detection unit 106 detects a time period during which the amount of change in the magnetic field strength of the geomagnetism detected by the geomagnetic sensor 103 is greater than or equal to a predetermined amount, as a time period during which an abnormality occurs in the magnetic field strength.

Furthermore, the geomagnetic noise detection unit 106 detects a time period during which the pattern representing the time-series change of the magnetic field strength detected by the geomagnetic sensor 103 during movement of the mobile terminal is different from a standard pattern, as a time period during which an abnormality occurs in the magnetic field strength. More specifically, the geomagnetic noise detection unit 106 determines (detects), at predetermined time intervals, whether or not an abnormality occurs in geomagnetic detection, i.e. whether or not geomagnetic noise occurs, based on the detection result of the angular velocity sensor 102 and the magnetic field strength detected by the geomagnetic sensor 103. In the case of determining that geomagnetic noise occurs, the geomagnetic noise detection unit 106 outputs a geomagnetic noise pattern representing time-series change of geomagnetic noise (magnetic field strength detected by the geomagnetic sensor 103) to the geomagnetic noise pattern management unit 108 as an occurring geomagnetic noise pattern, during the time when geomagnetic noise occurs.

The coordinate estimation unit 107 calculates (estimates) a current position of the position detection apparatus 100 as current position coordinates, based on immediately previously calculated coordinates and the movement amount calculated by the movement amount detection unit 104. The current position coordinates are used as the immediately previously calculated coordinates when calculating the next current position coordinates. The immediately previously calculated coordinates are hereafter referred to as previously estimated coordinates.

The coordinate estimation unit 107 further calculates accuracy of the current position coordinates as current position accuracy, based on at least one of: a distance between a previously recognized reference point (described later) and the current position coordinates; complexity of movement such as curb and tilt between the previously recognized reference point and the current position coordinates; and a time period of movement between the previously recognized reference point and the current position coordinates. The coordinate estimation unit 107 outputs the current position coordinates and the current position accuracy to the geomagnetic noise pattern management unit 108. For example, the coordinate estimation unit 107 calculates the current position coordinates and the current position accuracy and outputs them to the geomagnetic noise pattern management unit 108 and also outputs the current position coordinates to the coordinate correction unit 110, at predetermined time intervals.

The geomagnetic noise pattern storage unit 109 is an example of a recording medium, and stores a table indicating, for each reference point, a geomagnetic noise pattern in the reference point (hereafter referred to as a reference noise pattern), coordinates of the reference point (hereafter referred to as reference coordinates), and accuracy of the coordinates of the reference point (hereafter referred to as reference accuracy) in association with each other. The reference point mentioned here is an already identified position, and is a position, in the global coordinate system or the home coordinate system, which serves as a reference for correcting the current position coordinates.

When an abnormality occurs in the magnetic field strength detected by the geomagnetic sensor 103 during movement of the mobile terminal, the geomagnetic noise pattern management unit 108 stores, in the recording medium (the geomagnetic noise pattern storage unit 109), a geomagnetic noise pattern that is a pattern representing a time-series change of the magnetic field strength detected by the geomagnetic sensor 103, in association with the current position coordinates estimated by the coordinate estimation unit 107 when the abnormality occurs. More specifically, the geomagnetic noise pattern management unit 108 obtains the occurring geomagnetic noise pattern from the geomagnetic noise detection unit 106. The geomagnetic noise pattern management unit 108 also obtains, from the coordinate estimation unit 107, the current position coordinates and the current position accuracy calculated by the coordinate estimation unit 107 at the time when the occurring geomagnetic noise pattern is obtained, i.e. when geomagnetic noise occurs.

The geomagnetic noise pattern management unit 108 determines whether or not to correct the current position coordinates, based on the obtained occurring geomagnetic noise pattern, the current position coordinates and the current position accuracy, and the table in the geomagnetic noise pattern storage unit 109. The current position coordinates the correction of which is determined are current position coordinates to be processed (processing-target current position coordinates), and are calculated by the coordinate estimation unit 107 at the time when geomagnetic noise occurs. The current position coordinates represent the position of the position detection apparatus 100 at the time of detecting the geomagnetic noise occurrence.

In the case of determining to correct the current position coordinates, the geomagnetic noise pattern management unit 108 instructs the coordinate correction unit 110 to correct the current position coordinates. The geomagnetic noise pattern management unit 108 also updates the table in the geomagnetic noise pattern storage unit 109 as necessary.

The coordinate correction unit 110 obtains the current position coordinates from the coordinate estimation unit 107, and outputs the current position coordinates. In the case of receiving the instruction to correct the current position coordinates from the geomagnetic noise pattern management unit 108, the coordinate correction unit 110 obtains reference coordinates which are coordinates to be corrected to, from the geomagnetic noise pattern management unit 108. The coordinate correction unit 110 then replaces the current position coordinates with the reference coordinates, and outputs the reference coordinates as corrected current position coordinates.

FIG. 2 is a diagram showing the table in the geomagnetic noise pattern storage unit 109.

A table 109a indicates, for each reference point mentioned above, a reference point ID for identifying the reference point, a reference noise pattern in the reference point, reference coordinates of the reference point, reference accuracy of the reference point, and an update time of the reference point, in association with each other.

For example, in the table 109a, a reference noise pattern "reference noise pattern 1", reference coordinates "(X2, Y2, Z2)", reference accuracy "60%", and an update time "20000202:22:10:05" are associated with a reference point ID "p1".

The position detection apparatus 100 having the above structure detects (estimates) the position of the position detection apparatus 100 in real time by autonomous navigation using the detection results of the acceleration sensor 101, the angular velocity sensor 102, and the geomagnetic sensor 103, and appropriately corrects the detected position based on geomagnetic noise.

Figure 3:
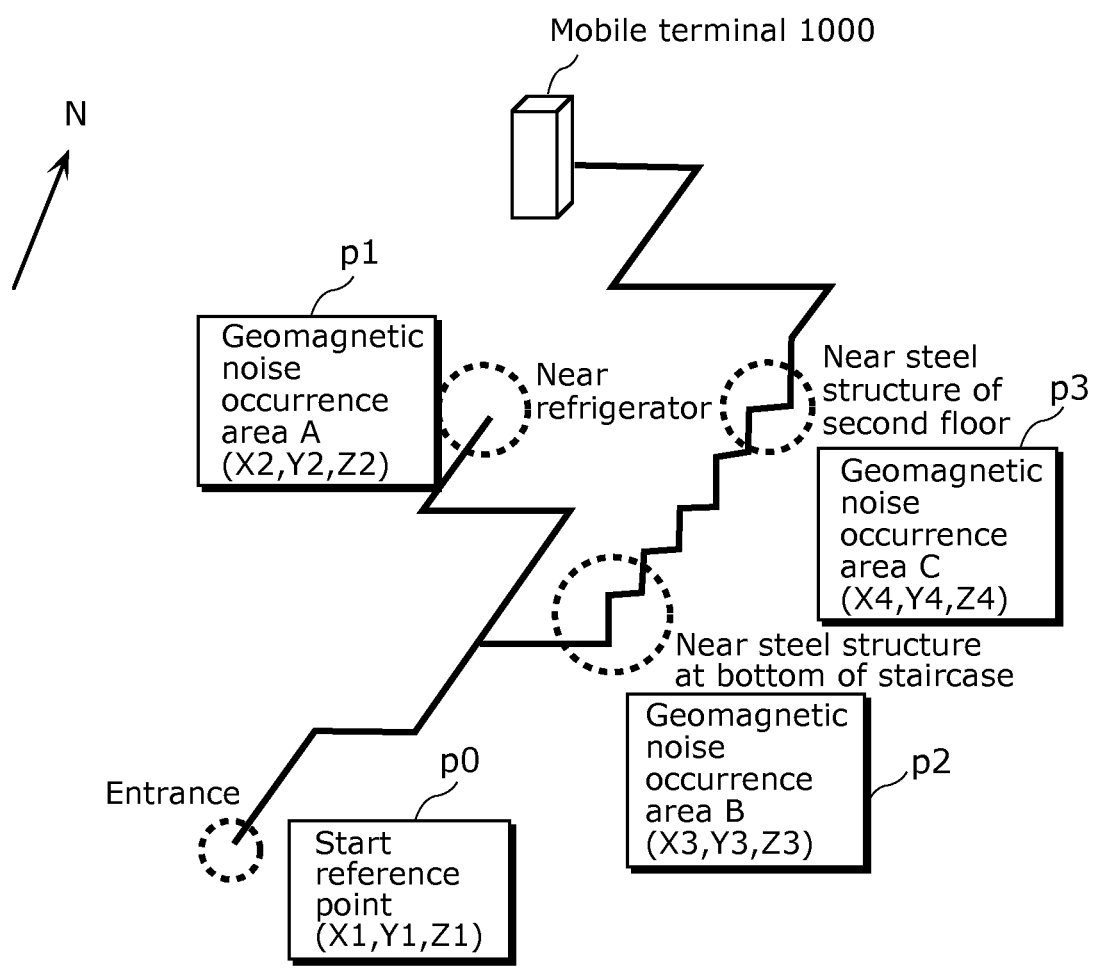
[FIG. 3]

FIG. 3 is a diagram showing an example of geomagnetic noise occurrence areas in the home. As shown in FIG. 3, a mobile terminal 1000 including the position detection apparatus 100 first moves in the home (indoor) from a start reference point p0 which is an entrance. Next, the mobile terminal 1000 passes near, for example, a refrigerator which is a geomagnetic noise occurrence area A. At this time, the position detection apparatus 100 in the mobile terminal 1000 determines that geomagnetic noise has occurred due to magnetism generated by the refrigerator or a metal plate of the refrigerator. That is, the geomagnetic sensor 103 in the position detection apparatus 100 detects a magnetic field different from a magnetic field that is logically detected due to geomagnetism. Here, the magnetic field logically detected is a magnetic field strength of geomagnetism predicted according to movement of the mobile terminal 1000, and is, for example, a magnetic field strength range of the natural world. Thus, the position detection apparatus 100 can also determine that there is an abnormality in the detected magnetic field strength when, for instance, the detected magnetic field strength is completely different from that of the natural world.

Likewise, when the mobile terminal 1000 passes near, for example, a steel structure at the bottom of a staircase which is a geomagnetic noise occurrence area B, the position detection apparatus 100 determines that geomagnetic noise has occurred due to an influence of the steel structure. Further, when the mobile terminal 1000 goes upstairs and passes near, for example, a steel structure of the second floor which is a geomagnetic noise occurrence area C, the position detection apparatus 100 determines that geomagnetic noise has occurred due to an influence of the steel structure.

In other words, in these geomagnetic noise occurrence areas, the geomagnetism (magnetic field) is disturbed by electrical equipment, structures, and the like in the home or indoors. Thus, it is possible to determine that there is an abnormality in the detected magnetic field strength. Such geomagnetic noise occurrence areas A and B are identified respectively by the reference point IDs "p1" and "p2" and stored in the table 109a in the geomagnetic noise pattern storage unit 109.

Figure 4:
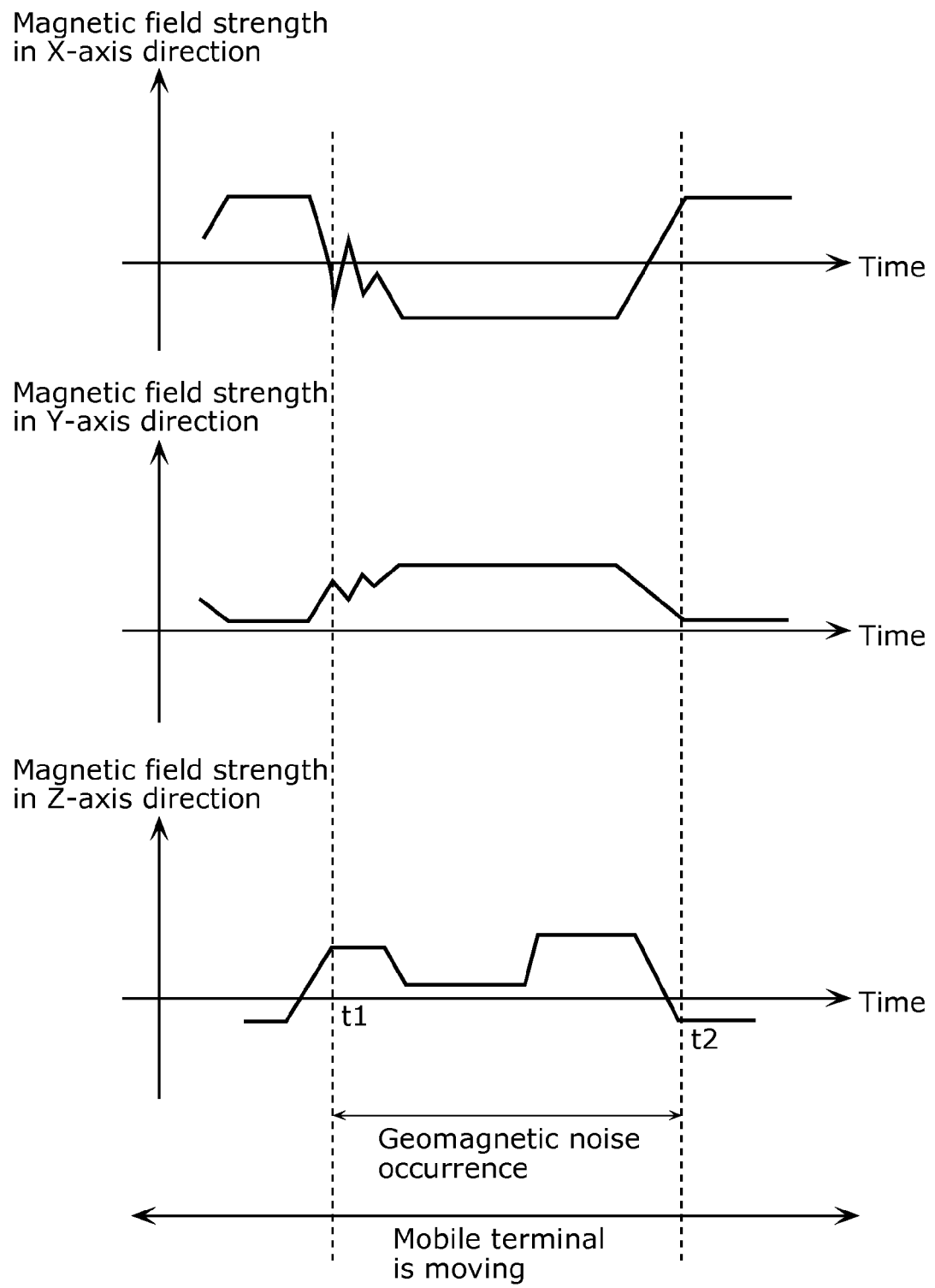
[FIG. 4]

FIG. 4 is a diagram showing an example of an occurring geomagnetic noise pattern.

The geomagnetic sensor 103 detects a magnetic field strength in each of the X-axis direction, the Y-axis direction, and the Z-axis direction, at predetermined time intervals (e.g. 10 ms). When it is assumed that the mobile terminal 1000 moves and passes a geomagnetic noise occurrence area such as near the refrigerator mentioned above, the magnetic field strength in each of the X-axis direction, the Y-axis direction, and the Z-axis direction detected by the geomagnetic sensor 103 changes in a manner different from an assumed magnetic field strength by geomagnetism.

For example, in the case where the mobile terminal 1000 is present in the geomagnetic noise occurrence area in a time period from time t1 to time t2 during movement, the geomagnetic sensor 103 detects, in this time period, a magnetic field strength different from the assumed magnetic field strength by geomagnetism in each of the three axial directions as shown in FIG. 4.

From this detection, the geomagnetic noise detection unit 106 determines that geomagnetic noise occurs in the above time period. The geomagnetic noise detection unit 106 then outputs a pattern (geomagnetic noise pattern) representing the temporal change of the magnetic field strength in each of the X-axis direction, the Y-axis direction, and the Z-axis direction in the above time period, to the geomagnetic noise pattern management unit 108 as the occurring geomagnetic noise pattern.

Note that there is a high possibility that the occurring geomagnetic noise pattern repeats each time the mobile terminal 1000 passes the same geomagnetic noise occurrence area.

Figure 5:
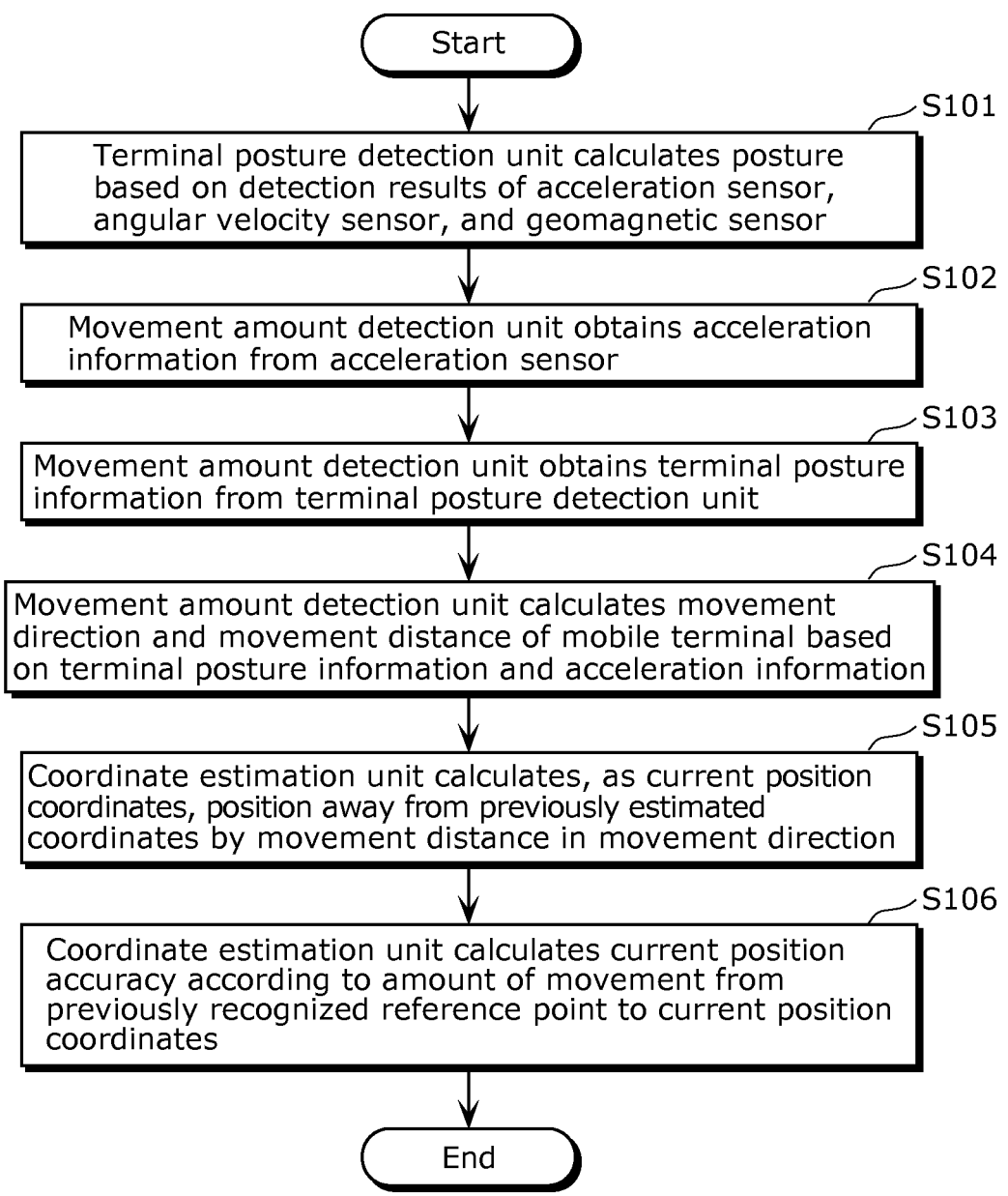
[FIG. 5]

FIG. 5 is a flowchart showing flow of a process relating to coordinate estimation by the position detection apparatus 100 according to this embodiment.

First, the terminal posture detection unit 105 calculates the posture of the mobile terminal 1000 based on the detection results of the acceleration sensor 101, the angular velocity sensor 102, and the geomagnetic sensor 103 (Step S101).

Next, the movement amount detection unit 104 obtains acceleration information outputted from the acceleration sensor 101 from when the previously estimated coordinates are calculated by the coordinate estimation unit 107 (Step S102). Note that here, if the previously estimated coordinates are not calculated yet, the movement amount detection unit 104 may obtain acceleration information outputted from when the mobile terminal 1000 passes a preset reference point such as the entrance. In the case where the position detection apparatus 100 has a GPS function, the movement amount detection unit 104 may obtain acceleration information outputted from the last time the coordinates (the position of the position detection apparatus 100) are calculated by the GPS function.

Next, the movement amount detection unit 104 obtains terminal posture information indicating the posture calculated by the terminal posture detection unit 105, from the terminal posture detection unit 105 (Step S103).

Next, the movement amount detection unit 104 calculates the movement direction and the movement distance of the mobile terminal 1000, based on the terminal posture information and the acceleration information (Step S104).

Next, the coordinate estimation unit 107 calculates, as the current position coordinates, the position away from the previously estimated coordinates in the movement direction calculated by the movement amount detection unit 104 by the movement distance calculated by the movement amount detection unit 104 (Step S105).

Next, the coordinate estimation unit 107 also calculates the current position accuracy according to the distance between the previously recognized reference point and the current position coordinates (Step S106).

Note that the previously recognized reference point is the position of the mobile terminal 1000 at the time of immediately previous determination by the geomagnetic noise detection unit 106 that geomagnetic noise occurs. That is, the coordinate estimation unit 107 sets the current position accuracy based on a total amount of movement from the time of previous reference point recognition. For example, the coordinate estimation unit 107 calculates lower current position accuracy when the current position coordinates are farther from the previously recognized reference point. The current position accuracy may be calculated by taking into consideration only one or all of the movement distance from the previous reference point, the complexity of movement from the previous reference point due to the amount of curb, tilt, and the like during movement, and the time period of movement from the previous reference point.

Figure 6:
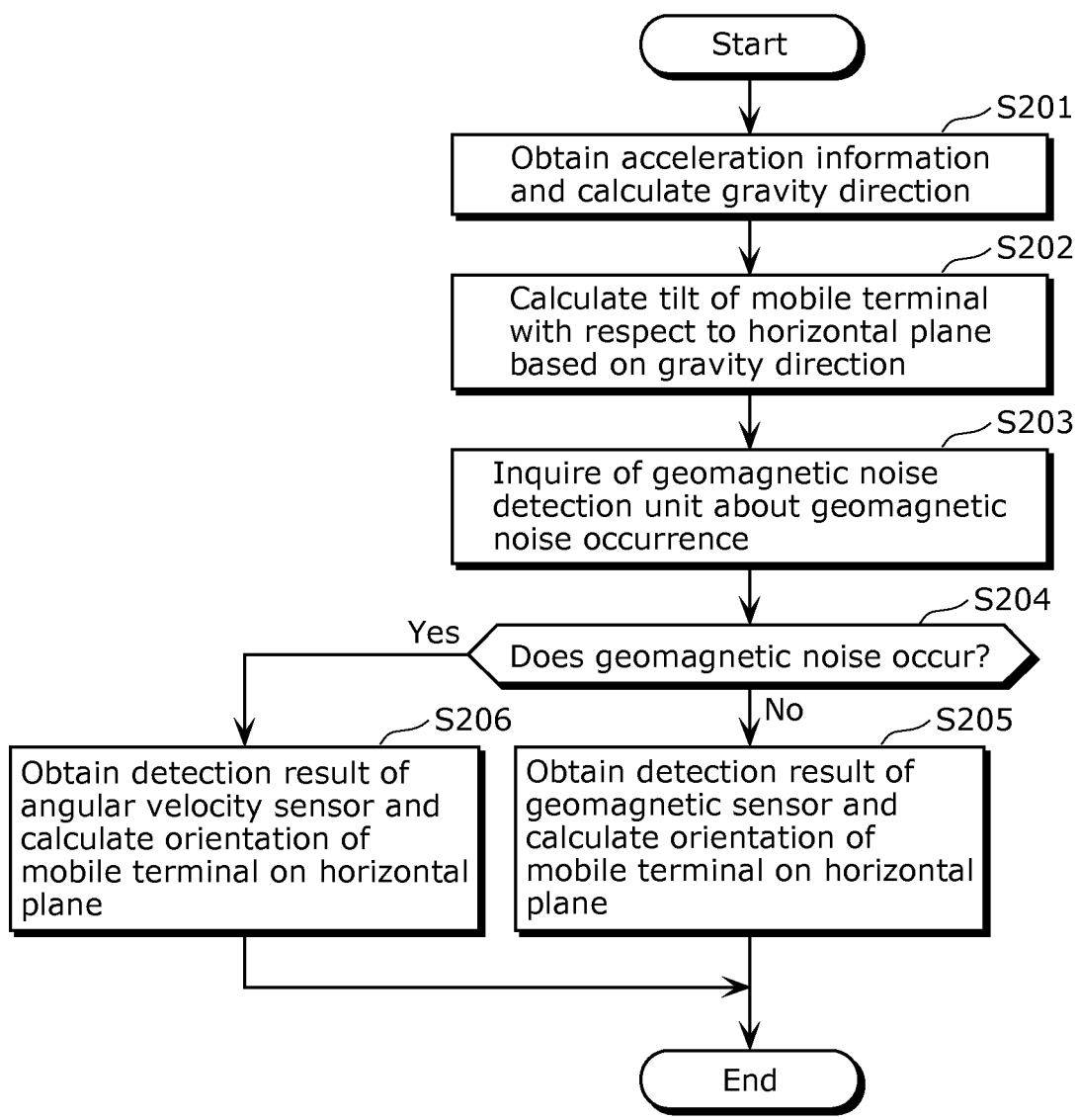
[FIG. 6]

FIG. 6 is a flowchart showing flow of a process by the terminal posture detection unit 105.

First, the terminal posture detection unit 105 obtains acceleration information from the acceleration sensor 101, and calculates the gravity direction (vertical direction) in the local coordinate system based on the acceleration information (Step S201). For example, the terminal posture detection unit 105 calculates the direction of the vertical force corresponding to gravity, based on the logically derived value of gravity and the direction and magnitude of the force in the local coordinate system indicated by the acceleration information.

Next, the terminal posture detection unit 105 calculates the tilt of the mobile terminal 1000 with respect to the horizontal plane, based on the tilt of the gravity direction with respect to the X, Y, and Y axes in the local coordinate system (Step S203).

Next, the terminal posture detection unit 105 inquires of the geomagnetic noise detection unit 106 about geomagnetic noise occurrence (Step S203), to determine whether or not geomagnetic noise occurs (Step S204).

In the case of determining that geomagnetic noise does not occur (Step S204: No), the terminal posture detection unit 105 obtains the detection result of the geomagnetic sensor 103, and calculates the orientation of the mobile terminal 1000 on the horizontal plane based on the obtained detection result and the tilt calculated in Step S202 (Step S205). In the case of determining that geomagnetic noise occurs (Step S204: Yes), on the other hand, the terminal posture detection unit 105 obtains the detection result of the angular velocity sensor 102, and calculates the orientation of the mobile terminal 1000 on the horizontal plane based on the obtained detection result and the tilt calculated in Step S202 (Step S206). In this case, the terminal posture detection unit 105 specifies an orientation change on the horizontal plane, based on the rotation direction and the angular velocity detected by the angular velocity sensor 102 from the time of immediately previous calculation of the orientation of the mobile terminal 1000 on the horizontal plane. The terminal posture detection unit 105 adds the specified orientation change to the immediately previously calculated orientation on the horizontal plane, thereby calculating the current orientation of the mobile terminal 1000 on the horizontal plane.

Note that, in the case of determining that geomagnetic noise does not occur in Step S204 (Step S204: No), the terminal posture detection unit 105 may calculate the orientation of the mobile terminal 1000 on the horizontal plane more accurately based on the detection results of both the geomagnetic sensor 103 and the angular velocity sensor 102.

By the process described above, the terminal posture detection unit 105 detects the posture of the mobile terminal 1000.

Figure 7:
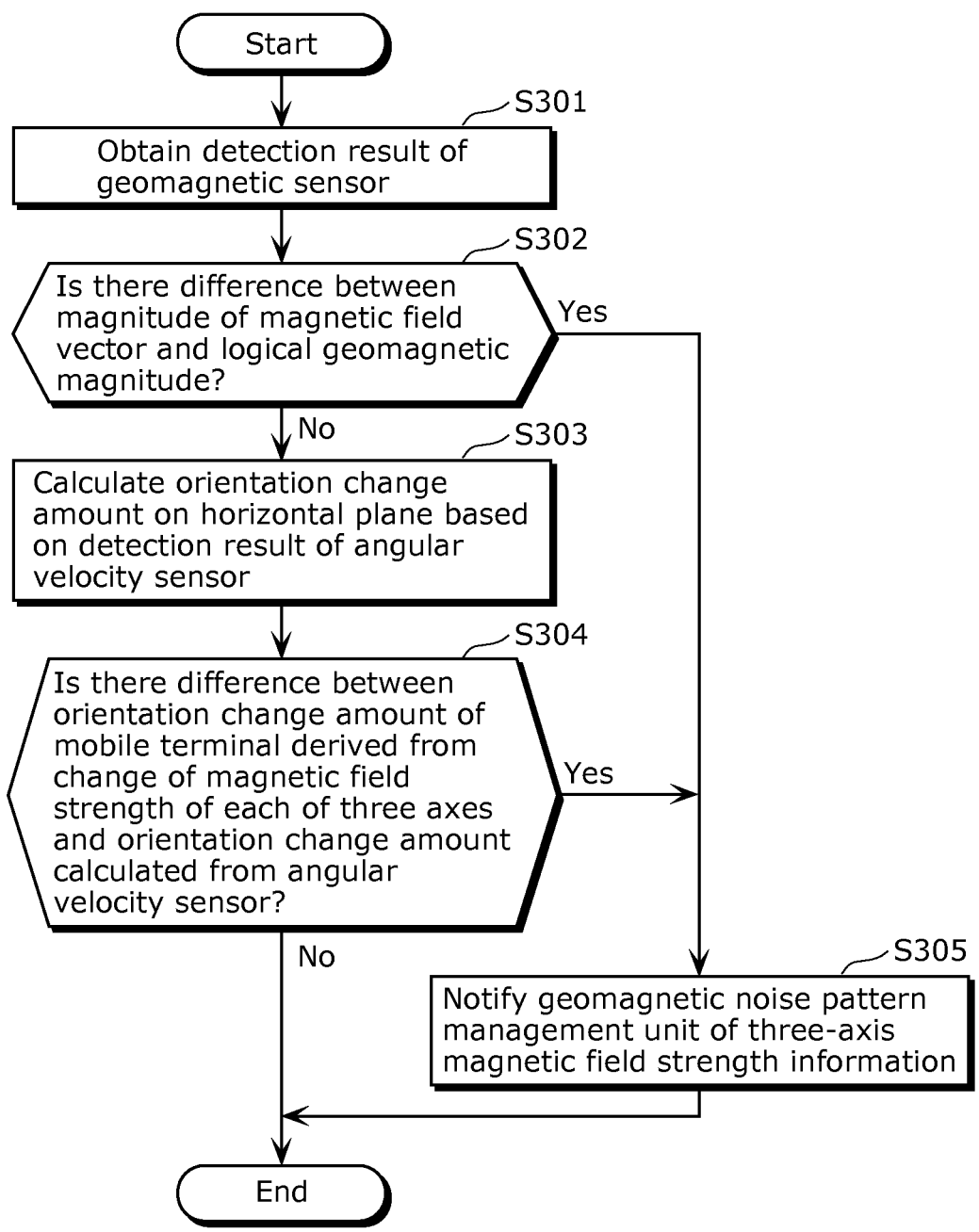
[FIG. 7]

FIG. 7 is a flowchart showing flow of a process by the geomagnetic noise detection unit 106.

First, the geomagnetic noise detection unit 106 obtains the detection result (the magnetic field strength in each of the X-axis direction, the Y-axis direction, and the Z-axis direction) of the geomagnetic sensor 103, from the geomagnetic sensor 103 (Step S301).

The geomagnetic noise detection unit 106 then determines whether or not there is a difference of a predetermined magnitude or ratio or greater between a magnitude of a magnetic field vector represented by the magnetic field strength in each of the X-axis direction, the Y-axis direction, and the Z-axis direction and a logical geomagnetic magnitude (strength) (Step S302).

Note that the logical geomagnetic magnitude (strength) mentioned here is a predetermined strength, e.g. the magnetic field strength of the natural world. The geomagnetic noise detection unit 106 may change the logical geomagnetic magnitude depending on the position of the position detection apparatus 100. In such a case, it is sufficient as long as the geomagnetic noise detection unit 106 uses a database indicating, for each position on the earth, the logical geomagnetic magnitude in the position. For example, in the case where the position detection apparatus 100 has a GPS function, the geomagnetic noise detection unit 106 predicts the current position of the position detection apparatus 100 on the earth based on the coordinates (the position of the position detection apparatus 100) last calculated by the GPS function, and selects the logical geomagnetic magnitude in the predicted position from the database. Here, the geomagnetic noise detection unit 106 may use the coordinates last calculated by the GPS function as the predicted current position on the earth. Alternatively, the geomagnetic noise detection unit 106 may receive input of the position on the earth from the user, and select the geomagnetic magnitude in the position from the database.

In the case of determining that there is the difference (Step S302: Yes), the geomagnetic noise detection unit 106 determines that geomagnetic noise has occurred. The geomagnetic noise detection unit 106 accordingly outputs three-axis magnetic field strength information indicating the magnetic field strength in each of the X-axis direction, the Y-axis direction, and the Z-axis direction, to the geomagnetic noise pattern management unit 108 (Step S305).

In the case of determining that there is not the difference (Step S202: No), on the other hand, the geomagnetic noise detection unit 106 calculates an orientation change amount of the mobile terminal 1000 on the horizontal plane in a predetermined time period, based on the detection result of the angular velocity sensor 102 (Step S303).

Following this, the geomagnetic noise detection unit 106 determines whether or not there is a difference of a predetermined amount or ratio or greater between an orientation change amount of the mobile terminal 1000 derived from a change in magnetic field strength in each of the X-axis direction, the Y-axis direction, and the Z-axis direction in the predetermined time period and the orientation change amount calculated in Step S303 (Step S304). That is, the geomagnetic noise detection unit 106 detects whether or not an abnormality occurs in geomagnetic detection, by comparing the orientation change amount of the position detection apparatus 100 detected by the angular velocity sensor 102 and the orientation change amount of the mobile terminal 1000 derived from the change in magnetic field strength in each of the three axial directions detected by the geomagnetic sensor 103.

In the case of determining that there is the difference (Step S304: Yes), the geomagnetic noise detection unit 106 determines that there is geomagnetic noise (abnormality). The geomagnetic noise detection unit 106 accordingly outputs the three-axis magnetic field strength information indicating the magnetic field strength in each of the X-axis direction, the Y-axis direction, and the Z-axis direction, to the geomagnetic noise pattern management unit 108 (Step S305).

In the case of determining that there is not the difference (Step S304: No), on the other hand, the geomagnetic noise detection unit 106 detects that there is no geomagnetic noise (abnormality).

The geomagnetic noise detection unit 106 repeatedly performs the process of Steps S301 to S305 at predetermined time intervals (e.g. 10 ms). Hence, the geomagnetic noise detection unit 106 repeatedly performs Step S305, for example in a time period from time t2 to time t3 shown in FIG. 3. By sequentially outputting the three-axis magnetic field strength information in the time period, the geomagnetic noise detection unit 106 outputs, to the geomagnetic noise pattern management unit 108, the occurring geomagnetic noise pattern representing the time-series change of the magnetic field strength in each of the X-axis direction, the Y-axis direction, and the Z-axis direction.

When outputting the three-axis magnetic field strength information to the geomagnetic noise pattern management unit 108, the geomagnetic noise detection unit 106 corrects the magnetic field strength in each of the X-axis direction, the Y-axis direction, and the Z-axis direction indicated by the three-axis magnetic field strength information to a magnetic field strength in a predetermined basic posture, based on the posture calculated by the terminal posture detection unit 105. The geomagnetic noise detection unit 106 then outputs the three-axis magnetic field strength information indicating the corrected magnetic field strengths, to the geomagnetic noise pattern management unit 108.

Thus, in this embodiment, in the case where, in Step S304, there is the difference of the predetermined amount or ratio or greater between the orientation change amount of the mobile terminal 1000 (position detection apparatus 100) detected by the angular velocity sensor 102 and the orientation change amount of the mobile terminal 1000 derived from the change in magnetic field strength in each of the three axial directions detected by the geomagnetic sensor 103, the geomagnetic noise detection unit 106 detects that there is an abnormality in geomagnetic detection.

Typically, when a magnetic field strength different from a magnetic field strength logically derived according to a latitude and a longitude of a specific position or location is detected, the geomagnetic noise detection unit 106 detects that there is an abnormality in geomagnetic detection in the specific position or location. Conversely, when a magnetic field strength substantially equal to the logically-derived magnetic field strength is detected, the geomagnetic noise detection unit 106 detects that there is no abnormality in geomagnetic detection in the specific position or location.

However, there is a special case where, even if a magnetic field unrelated to geomagnetism is present near the position detection apparatus 100, a magnetic field strength substantially equal to the logically-derived magnetic field strength is detected as a result of a change in orientation of the position detection apparatus 100. In such a special case, an occurrence of an abnormality in geomagnetic detection should actually be detected. In view of this, the orientation change amount of the position detection apparatus 100 detected by the angular velocity sensor 102 and the orientation change amount of the position detection apparatus 100 derived from the change in magnetic field strength detected by the geomagnetic sensor 103 are compared with each other. By doing so, an occurrence of an abnormality in geomagnetic detection can be appropriately detected even in such a special case. In detail, in the above-mentioned special case, the orientation change amount of the position detection apparatus 100 detected by the angular velocity sensor 102 and the orientation change amount of the position detection apparatus 100 derived from the change in magnetic field strength detected by the geomagnetic sensor 103 are different. Accordingly, an occurrence of an abnormality in geomagnetic detection can be detected when the difference between these orientation change amounts is equal to or more than the predetermined amount or ratio.

Note that the geomagnetic pattern acquisition unit 106A acquires a geomagnetic pattern that is a time-series pattern of the logical magnetic field strength detected by the geomagnetic sensor 103, and may include the geomagnetic noise detection unit 106. The geomagnetic noise detection unit 106 may detect, as the geomagnetic noise pattern, a geomagnetic pattern during a time in which an occurrence of an abnormality is detected in the magnetic field strength.

Moreover, the process of Steps S303 and S304 can prevent false detection in determining whether or not there is geomagnetic noise, i.e. whether or not there is an abnormality in geomagnetic detection. There is a case where the magnetic field strength (magnetic field strength in each of the X-axis direction, the Y-axis direction, and the Z-axis direction) detected by the geomagnetic sensor 103 changes according to a change in orientation of the position detection apparatus 100. It is, however, possible to prevent wrong determination that there is an abnormality in geomagnetic detection due to a change in magnetic field strength, in such a case.

Figure 8:
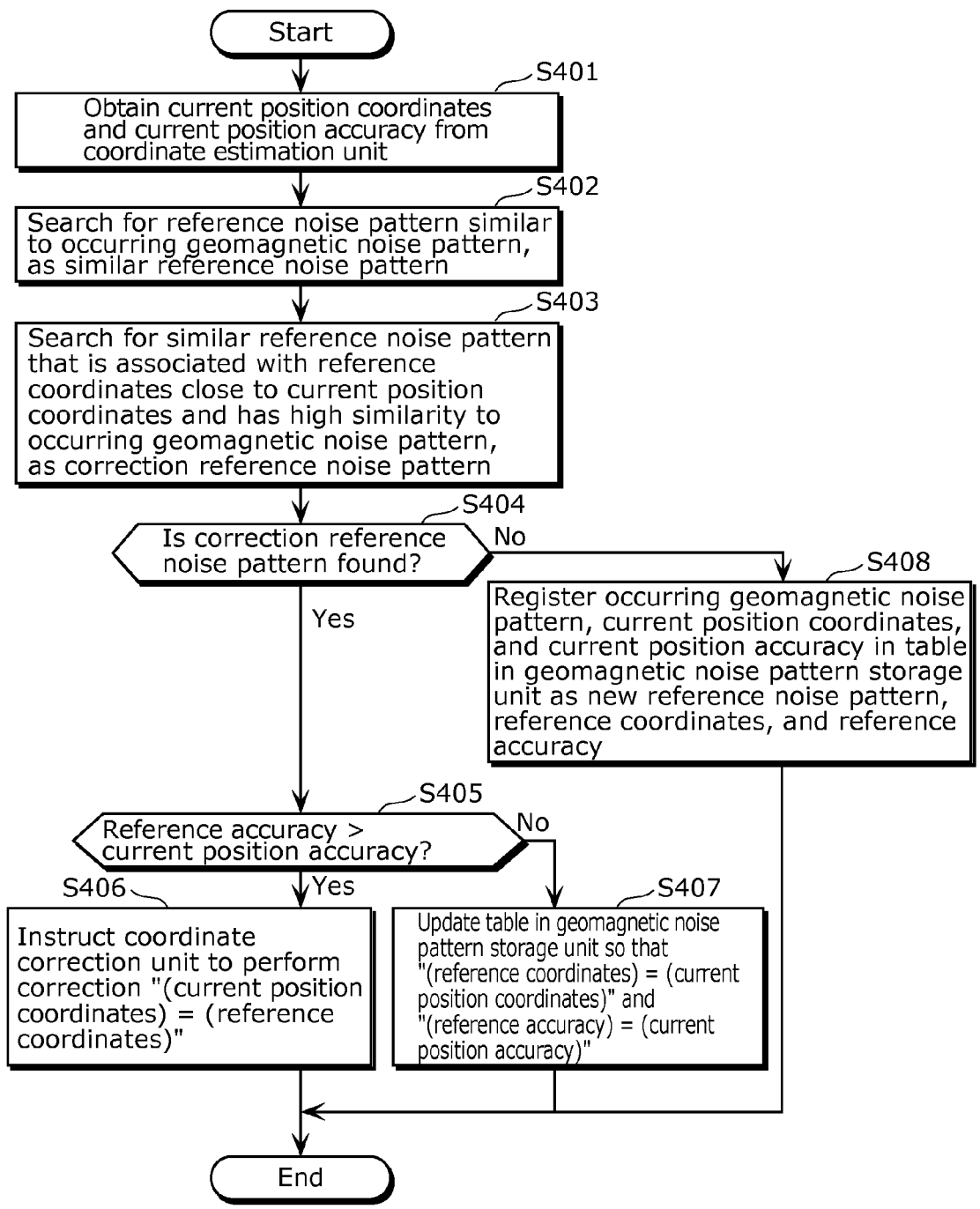
[FIG. 8]

FIG. 8 is a flowchart showing flow of a process by the geomagnetic noise pattern management unit 108.

First, the geomagnetic noise pattern management unit 108 obtains, from the coordinate estimation unit 107, the current position coordinates (processing-target current position coordinates) and the current position accuracy calculated by the coordinate estimation unit 107 at the time when the occurring geomagnetic noise pattern is obtained from the geomagnetic noise detection unit 106, i.e. when geomagnetic noise occurs (Step S401).

Next, the geomagnetic noise pattern management unit 108 references to the table 109a in the geomagnetic noise pattern storage unit 109, and searches the table 109a for a reference noise pattern similar to the occurring geomagnetic noise pattern, as a similar reference noise pattern (Step S402).

When one or more similar reference noise patterns are found in Step S402, the geomagnetic noise pattern management unit 108 further searches the one or more similar reference noise patterns for a similar reference noise pattern that is associated with reference coordinates close to the current position coordinates in the table 109a and has high similarity to the occurring geomagnetic noise pattern, as a correction reference noise pattern (Step S403). That is, the geomagnetic noise pattern management unit 108 searches for the correction reference noise pattern which is a pattern associated with the reference coordinates near the processing-target current position coordinates and similar to the occurring geomagnetic noise pattern.

When performing the search in Steps S402 and S403, the geomagnetic noise pattern management unit 108 compares the occurring geomagnetic noise pattern with each reference noise pattern (reference noise pattern to be compared (comparison-target reference noise pattern)). That is, the geomagnetic noise pattern management unit. 108 performs pattern matching between the occurring geomagnetic noise pattern and each reference noise pattern.

Here, the geomagnetic noise pattern management unit 108 performs scaling on the occurring geomagnetic noise pattern on a time axis beforehand. In detail, the geomagnetic noise pattern management unit 108 obtains the movement velocity of the mobile terminal 1000 at the time when the occurring geomagnetic noise pattern is generated, i.e. when geomagnetic noise occurs, from the movement amount detection unit 104.

The geomagnetic noise pattern management unit 108 then scales the occurring geomagnetic noise pattern in the direction of the time axis, according to a ratio between the movement velocity and a predetermined movement velocity (comparative reference velocity).

As a result, the time-axis scale of the occurring geomagnetic noise pattern matches the time-axis scale of the comparison-target reference noise pattern. After this, the geomagnetic noise pattern management unit 108 compares the scaled occurring geomagnetic noise pattern with the reference noise pattern (pattern matching).

For example, in Steps S402 and S403, the geomagnetic noise pattern management unit 108 calculates, for each reference noise pattern, a sum of: an index value which is larger when the distance between the processing-target current position coordinates and the reference coordinates corresponding to the comparison-target reference noise pattern is smaller; and a similarity level obtained as a result of pattern matching between the occurring geomagnetic noise pattern and the comparison-target reference noise pattern. The geomagnetic noise pattern management unit 108 selects a reference noise pattern corresponding to a sum that is largest of the calculated sums and is more than a predetermined threshold, as the correction reference noise pattern.

Next, the geomagnetic noise pattern management unit 108 determines whether or not the correction reference noise pattern is found as a result of the search in Step S403 (Step S404).

In the case of determining that the correction reference noise pattern is found (Step S404: Yes), the geomagnetic noise pattern management unit 108 further determines whether or not the reference accuracy associated with the correction reference noise pattern in the table 109a is higher than the current position accuracy obtained in Step S401 (Step S405).

Next, in the case of determining that the reference accuracy is higher than the current position accuracy in Step S405 (Step S405: Yes), the geomagnetic noise pattern management unit 108 instructs the coordinate correction unit 110 to correct the current position coordinates by replacing the current position coordinates with the reference coordinates associated with the correction reference noise pattern in the table 109a (Step S406).

The coordinate correction unit 110 obtains the reference coordinates from the geomagnetic noise pattern management unit 108. The coordinate correction unit 110 then replaces the current position coordinates obtained from the coordinate estimation unit 107 with the reference coordinates to correct the current position coordinates, and outputs the corrected current position coordinates (=reference coordinates). The geomagnetic noise pattern management unit 108 notifies the coordinate estimation unit 107 of the reference coordinates associated with the correction reference noise pattern in the table 109a, as the previously recognized reference point.

Thus, when the correction reference noise pattern is available, the processing-target current position coordinates are corrected in the case where the reference accuracy associated with the correction reference noise pattern is higher than the current position accuracy. This prevents the current position coordinates from being corrected even in the case where the accuracy of the reference coordinates stored in the geomagnetic noise pattern storage unit 109 in association with the correction reference noise pattern is equal to or lower than the accuracy of the current position coordinates. Hence, the mobile terminal 100 can detect a more proper position.

In the case of determining that the reference accuracy is equal to or lower than the current position accuracy in Step S405 (Step S405: No), the geomagnetic noise pattern management unit 108 updates the reference coordinates and the reference accuracy associated with the correction reference noise pattern in the table 109a in the geomagnetic noise pattern storage unit 109. In detail, the geomagnetic noise pattern management unit 108 replaces the reference coordinates and the reference accuracy associated with the correction reference noise pattern, respectively with the current position coordinates and the current position accuracy (Step S407).

In this way, the accuracy of the reference coordinates stored in the geomagnetic noise pattern storage unit 109 can be increased. The geomagnetic noise pattern management unit 108 notifies the coordinate estimation unit 107 of the current position coordinates as the previously recognized reference point.

Note that in the case of determining that the correction reference noise pattern is not found (Step S404: No), the geomagnetic noise pattern management unit 108, in Step S408, registers the occurring geomagnetic noise pattern, the current position coordinates, and the current position accuracy in the table 109a in the geomagnetic noise pattern storage unit 109 in association with each other, respectively as a new reference noise pattern, reference coordinates, and reference accuracy (Step S408). The geomagnetic noise pattern management unit 108 also registers a new reference point ID and update time in the table 109a, in association with the new reference noise pattern and the like. Here, the update time is a time at which the registration is performed. Moreover, the newly registered occurring geomagnetic noise pattern is the pattern scaled on the time axis as mentioned above. After Step S408, the geomagnetic noise pattern management unit 108 notifies the coordinate estimation unit 107 of the new reference coordinates as the previously recognized reference point.

Figure 9:
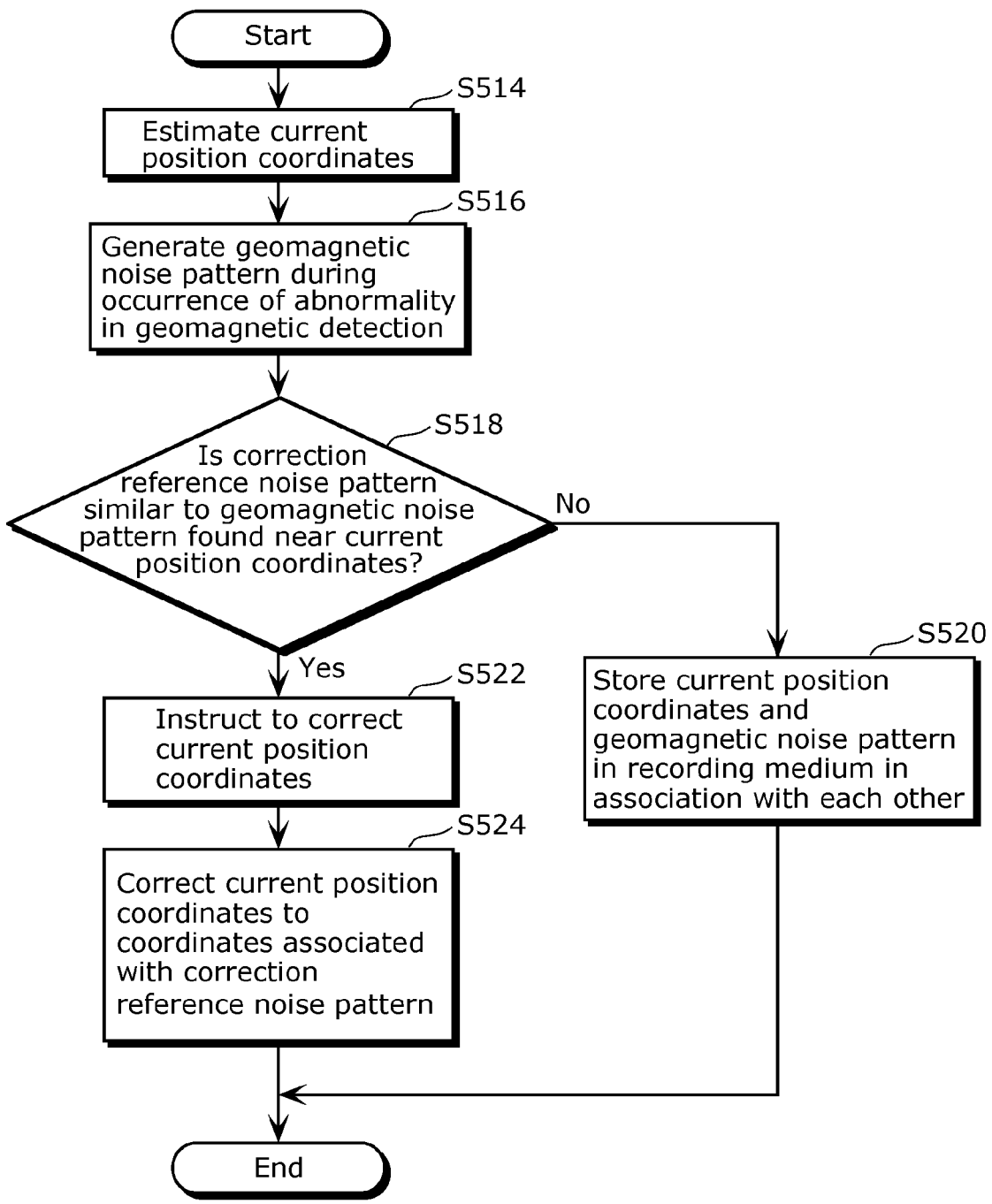
[FIG. 9]

FIG. 9 is a flowchart showing a position detection method according to this embodiment.

The position detection method according to this embodiment is a method of detecting the position of the mobile terminal 1000 by estimating the coordinates representing the position of the mobile terminal 1000 after movement. In this position detection method, first the coordinate estimation unit 107 estimates the current position coordinates representing the current position (Step S514).

Next, the geomagnetic noise detection unit 106 detects whether or not an abnormality occurs in geomagnetic detection by the geomagnetic sensor 103. The geomagnetic noise detection unit 106 generates the geomagnetic noise pattern (occurring geomagnetic noise pattern) which is a pattern representing the time-series change of the magnetic field strength detected by the geomagnetic sensor 103, during the occurrence of the abnormality (Step S516).

Next, the geomagnetic noise pattern management unit 108 searches the recording medium (geomagnetic noise pattern storage unit 109) in which one or more patterns (reference noise patterns) are stored, for the correction reference noise pattern which is a pattern (i) associated with coordinates near the processing-target current position coordinates estimated at the time of abnormality occurrence and (ii) similar to the geomagnetic noise pattern (Step S518).

In the case where the correction reference noise pattern is not found as a result of the search (Step S518: No), the geomagnetic noise pattern management unit 108 stores the processing-target current position coordinates and the geomagnetic noise pattern in the recording medium in association with each other (Step S520). In the case where the correction reference noise pattern is found as a result of the search (Step S518: Yes), on the other hand, the geomagnetic noise pattern management unit 108 instructs to correct the processing-target current position coordinates (Step S522). According to the correction instruction, the coordinate correction unit 110 corrects the processing-target current position coordinates to the coordinates (reference coordinates) stored in the recording medium in association with the correction reference noise pattern (Step S524).

Thus, in this embodiment, the geomagnetic noise pattern is generated during an occurrence of an abnormality in geomagnetic detection by the geomagnetic sensor 103, and the geomagnetic noise pattern storage unit 109 is searched for the correction reference noise pattern similar to the geomagnetic noise pattern. In the case where the correction reference noise pattern is found, the processing-target current position coordinates estimated at the time of abnormality occurrence are corrected to the reference coordinates stored in the geomagnetic noise pattern storage unit 109 in association with the correction reference noise pattern.

Since the occurring geomagnetic noise pattern has repeatability, if the reference coordinates are accurate, the processing-target current position coordinates can be corrected to proper coordinates based on the occurring geomagnetic noise pattern. Moreover, the correction reference noise pattern search is performed to search for the correction reference noise pattern which is associated with reference coordinates near the processing-target current position coordinates, so that the processing-target current position coordinates can be prevented from being wrongly corrected to distant coordinates.

Here, reference coordinates within a predetermined distance from the processing-target current position coordinates may be treated as reference coordinates near the processing-target current position coordinates.

In this embodiment, the process performed for deriving the proper coordinates, i.e. coordinates to be corrected to, is merely the search for the correction reference noise pattern similar to the occurring geomagnetic noise pattern. That is, the comparison (pattern matching) between the occurring geomagnetic noise pattern and the comparison-target reference noise pattern is conducted. Therefore, in this embodiment, there is no need for a camera required in PTL 1, and image processing for pattern matching between an image captured by the camera and a shape of a ventilation port is unnecessary. As a result, a proper position can be detected with a simple structure and process, contributing to reduced cost.

In this embodiment, in the case where the correction reference noise pattern is not found, the processing-target current position coordinates and the occurring geomagnetic noise pattern are stored in the geomagnetic noise pattern storage unit 109 in association with each other. This saves the user a trouble of storing the combination of the coordinates and the pattern in the geomagnetic noise pattern storage unit 109, as the database indicating such combinations can be automatically created and developed. Thus, the position detection apparatus 100 provides improved convenience even in an environment, such as inside a home, forming a diverse space depending on the user.

In the position detection apparatus 100 in this embodiment, before the estimation of the current position coordinates in Step S14, the terminal posture detection unit 105 detects the posture of the mobile terminal 1000 based on the detection results of the acceleration sensor 101 and the geomagnetic sensor 103. Following this, the movement amount detection unit 104 detects the movement amount indicating the movement direction and the movement distance of the mobile terminal 1000, based on the posture detected by the terminal posture detection unit 105 and the detection result of the acceleration sensor 101. As a result, in Step S514, the coordinate estimation unit 107 estimates, as the current position coordinates, the coordinates away from the previously estimated coordinates by the movement amount detected by the movement amount detection unit 104.

Thus, in this embodiment, the current position coordinates are detected as the current position of the mobile terminal 1000 and the position detection apparatus 100, based on the detection results of the acceleration sensor 101, the geomagnetic sensor 103, the terminal posture detection unit 105, and the movement amount detection unit 104. In other words, the current position of the position detection apparatus 100 is detected by autonomous navigation. This allows the current position of the position detection apparatus 100 to be detected accurately, and allows the detected position to be corrected to a more proper position. Though the current position of the position detection apparatus 100 is detected by autonomous navigation in this embodiment, the current position of the position detection apparatus 100 may be detected or estimated by another method such as a method using GPS.

In this embodiment, the geomagnetic noise pattern is generated by detecting the magnetic field strength at predetermined sampling intervals. In this case, if the movement velocity of the position detection apparatus 100 differs when the position detection apparatus 100 repeatedly passes the same position, the generated geomagnetic noise pattern will end up being different. Accordingly, in this embodiment, the occurring geomagnetic noise pattern is scaled so that the time-axis scale of the occurring geomagnetic noise pattern matches the time-axis scale of the comparison-target reference noise pattern stored in the geomagnetic noise pattern storage unit 109. This makes it possible to search for the appropriate correction reference noise pattern. In the case where the correction reference noise pattern is not found, the geomagnetic noise pattern scaled based on the predetermined movement velocity (comparative reference velocity) is stored in the recording medium. Since there is no need to store the movement velocity detected at the time of abnormality occurrence in the geomagnetic noise pattern storage unit 109, the storage capacity of the geomagnetic noise pattern storage unit 109 can be saved.

(Variation 1)

Variation 1 of this embodiment is described below. The geomagnetic noise pattern management unit 108 according to this variation is characterized in that the movement velocity of the mobile terminal 1000 is also stored in the table in the geomagnetic noise pattern storage unit 109.

FIG. 10 is a diagram showing the table in the geomagnetic noise pattern storage unit 109 according to this variation.

As shown in FIG. 10, a table 109*b* indicates, for each reference point, a reference point ID for identifying the reference point, a reference noise pattern in the reference point, reference coordinates of the reference point, reference accuracy of the reference point, movement velocity of the mobile terminal 1000 when passing the reference point, and an update time of the reference point, in association with each other. For example, in the table 109*b*, a reference noise pattern "reference noise pattern 1", reference coordinates "(X2, Y2, Z2)", reference accuracy "60%", movement velocity "1.5 m/sec", and an update time "20000202:22:10:0" are associated with a reference point ID "p1".

When comparing the occurring geomagnetic noise pattern with the comparison-target reference noise pattern, the geomagnetic noise pattern management unit 108 scales the comparison-target reference noise pattern in the direction of the time axis. In detail, the geomagnetic noise pattern management unit 108 obtains the movement velocity of the mobile terminal 1000 at the time when the mobile terminal 1000 passes the processing-target current position coordinates, from the movement amount detection unit 104. This movement velocity is the movement velocity of the mobile terminal 1000 at the time when geomagnetic noise occurs. The geomagnetic noise pattern management unit 108 then scales the comparison-target reference noise pattern in the direction of the time axis, according to a ratio between the movement velocity of the mobile terminal 1000 at the time when the mobile terminal 1000 passes the processing-target current position coordinates and the movement velocity associated with the comparison-target reference noise pattern in the table 109*b*. Hence, the occurring geomagnetic noise pattern and the comparison-target reference noise pattern are compared (pattern-matched) on the same scale.

When registering the occurring geomagnetic noise pattern in the table 109*b* as a new reference noise pattern, the geomagnetic noise pattern management unit 108 registers the occurring geomagnetic noise pattern outputted from the geomagnetic noise detection unit 106, without scaling it. The geomagnetic noise pattern management unit 108 also registers the movement velocity when the mobile terminal 1000 passes the processing-target current position coordinates, in the table 109*b* in association with the new reference noise pattern.

Thus, in this variation, the comparison-target reference noise pattern is scaled so that the time-axis scale of the comparison-target reference noise pattern stored in the geomagnetic noise pattern storage unit 109 matches the time-axis scale of the occurring geomagnetic noise pattern. This makes it possible to search for the appropriate correction reference noise pattern. In the case where the correction reference noise pattern is not found, the movement velocity is also stored in the geomagnetic noise pattern storage unit 109 in association with the processing-target current position coordinates and the like. Accordingly, the movement velocity necessary for scaling can be easily obtained and put to use.

(Variation 2)

Next, Variation 2 of this embodiment is described below. The geomagnetic noise pattern management unit 108 according to this variation is characterized in that a plurality of reference noise patterns are registered in the table in the geomagnetic noise pattern storage unit 109 for one reference point.

FIG. 11 is a diagram showing the table in the geomagnetic noise pattern storage unit 109 according to this variation.

As shown in FIG. 11, a table 109*c* indicates, for each reference point, a reference point ID for identifying the reference point, one or more reference noise patterns in the reference point, reference coordinates of the reference point, reference accuracy of the reference point, and an update time of the reference point, in association with each other. For example, in the table 109*c*, reference noise patterns "reference noise patterns 1*a*, 1*b*", reference coordinates "(X2, Y2, Z2)", reference accuracy "60%", movement velocity "1.5 m/sec", and update times "20000202:22:10:05, 20000205: 10:10:03" are associated with a reference point ID "p1".

In the case of determining that the correction reference noise pattern is found in Step S404 in FIG. 8 (Step S404: Yes), the geomagnetic noise pattern management unit 108 according to this variation performs Steps S406 and S407, as in the above embodiment. Here, the geomagnetic noise pattern management unit 108 according to this variation further registers the occurring geomagnetic noise pattern in the table 109*c* as a new reference noise pattern so as to be associated with the same reference point ID as the correction reference noise pattern.

When registering a new reference noise pattern in the table 109*c* in association with an existing reference point ID, the geomagnetic noise pattern management unit 108 also registers the time of the registration in the table 109*c* as a new update time, in addition to an existing update time.

When performing the search in Steps S402 and S403 in FIG. 8, the geomagnetic noise pattern management unit 108 according to this variation searches the table 109*c* including the two reference noise patterns 1*a* and 1*b* associated with the same reference coordinates (e.g. (X2, Y2, Z3)) for the correction reference noise pattern corresponding to the occurring geomagnetic noise pattern.

Thus, in this variation, a plurality of reference noise patterns are stored in the geomagnetic noise pattern storage unit 109 in association with the same reference coordinates. This increases a probability of correcting the processing-target current position coordinates to the above-mentioned same reference coordinates. That is, when a larger number of different reference noise patterns are registered in association with the same reference coordinates, the processing-target current position coordinates are corrected to the same reference coordinates with a higher probability. As a result, a more proper position can be detected.

When the geomagnetic noise pattern management unit 108 performs pattern matching between the occurring geomagnetic noise pattern and each of the plurality of reference noise patterns associated with the same reference coordinates, the pattern matching may be performed on a reference noise pattern associated with a more recent update time, with higher priority. Since a more recent reference noise pattern has higher reliability, the processing-target current position coordinates can be appropriately corrected in this way. That is, a geomagnetic noise pattern which varies with time can be handled, too.

(Variation 3)

Next, Variation 3 of this embodiment is described below. The geomagnetic noise pattern management unit 108 according to this variation is characterized in that a reference noise pattern type is also registered in the table in the geomagnetic noise pattern storage unit 109.

Figure 12:
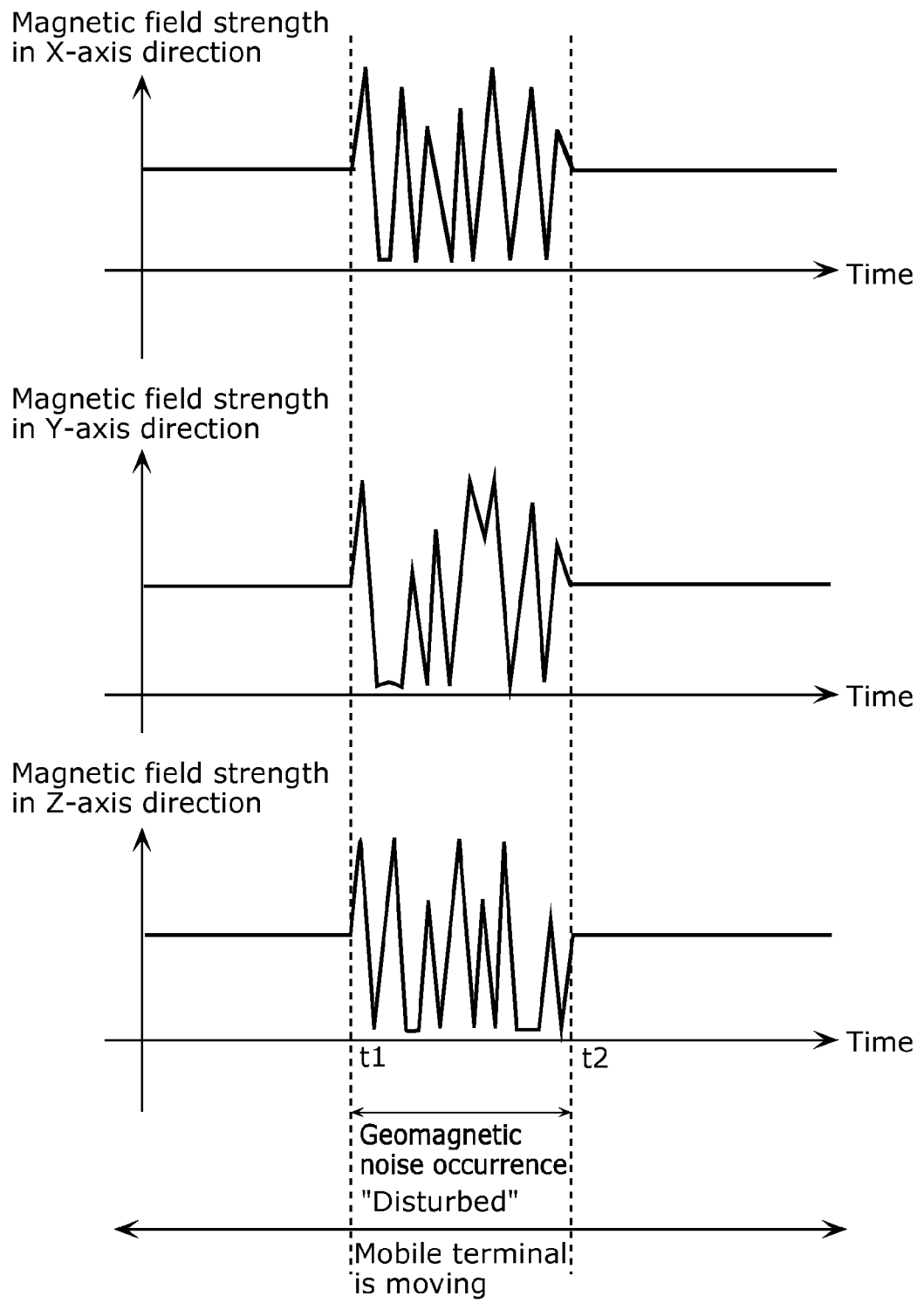
[FIG. 12]

FIG. 12 is a diagram showing an example of the occurring geomagnetic noise pattern.

For example, the magnetic field strength changes rapidly in an area, among the geomagnetic noise occurrence areas, where an apparatus including many motors or coils exists, as shown in FIG. 12.

When comparing the occurring geomagnetic noise pattern with the reference noise pattern in Steps S402 and S403 in FIG. 8, the geomagnetic noise pattern management unit 108 according to this variation first specifies the type of the occurring geomagnetic noise pattern. In detail, the geomagnetic noise pattern management unit 108 compares the amount of change per unit time of the magnetic field strength in time series represented by the occurring geomagnetic noise pattern, with a threshold. In the case of determining that the amount of change is more than the threshold, the geomagnetic noise pattern management unit 108 specifies the type of the occurring geomagnetic noise pattern as "disturbed". In the case of determining that the amount of change is equal to or less than the threshold, the geomagnetic noise pattern management unit 108 specifies the type of the occurring geomagnetic noise pattern as "steady".

FIG. 13 is a diagram showing the table in the geomagnetic noise pattern storage unit 109 according to this variation.

As shown in FIG. 13, a table 109d indicates, for each reference point, a reference point ID for identifying the reference point, a reference noise pattern in the reference point, a type of the reference noise pattern, reference coordinates of the reference point, reference accuracy of the reference point, and an update time of the reference point, in association with each other. For example, in the table 109d, a reference noise pattern "reference noise pattern 1", a type "disturbed", reference coordinates "(X2, Y2, Z2)", reference accuracy "60%", and an update time "20000202:22:10:05" are associated with a reference point ID "p1". In addition, in the table 109d, a reference noise pattern "reference noise pattern 2", a type "steady", reference coordinates "(X3, Y3, Z3)", reference accuracy "80%", and an update time "20030303:23:13:03" are associated with a reference point ID "p2".

In the case where the type of the occurring geomagnetic noise pattern is "disturbed", the geomagnetic noise pattern management unit 108, without performing pattern matching, searches the table 109d for a reference noise pattern associated with the type "disturbed", as the similar reference noise pattern or the correction reference noise pattern. For example, in the case where there are a plurality of reference noise patterns associated with the type "disturbed", the geomagnetic noise pattern management unit 108 searches the plurality of reference noise patterns for a reference noise pattern associated with reference coordinates closest to the processing-target current position coordinates, as the correction reference noise pattern.

In the case where the type of the occurring geomagnetic noise pattern is "steady", on the other hand, the geomagnetic noise pattern management unit 108 extracts each reference noise pattern associated with the type "steady", from the table 109d. The geomagnetic noise pattern management unit 108 then searches the one or more reference noise patterns associated with the type "steady" for the similar reference noise pattern or the correction reference noise pattern, by pattern matching.

When registering the occurring geomagnetic noise pattern in the table 109d in the geomagnetic noise pattern storage unit 109 as a new reference noise pattern in Step S408 in FIG. 8, the geomagnetic noise pattern management unit 108 according to this variation also registers the type specified for the occurring geomagnetic noise pattern, in the table 109d.

Thus, in this variation, in the case where the type of the geomagnetic noise pattern is "disturbed", the reference noise pattern stored in the geomagnetic noise pattern storage unit 109 in association with the type "disturbed" is searched for as the correction reference noise pattern. Therefore, the correction reference noise pattern can be easily searched for, without performing pattern matching. This contributes to both reduced computation required for the search for the correction reference noise pattern, and improved position detection accuracy. When the time-series change of the magnetic field strength represented by each of the occurring geomagnetic noise pattern and the comparison-target reference noise pattern is rapid, it is difficult to perform pattern matching. Through the search using the above-mentioned type, however, the appropriate correction reference noise pattern can be detected even in such a case.

(Variation 4)

Next, the minimum structure according to this embodiment is described as Variation 4.

Figure 14:
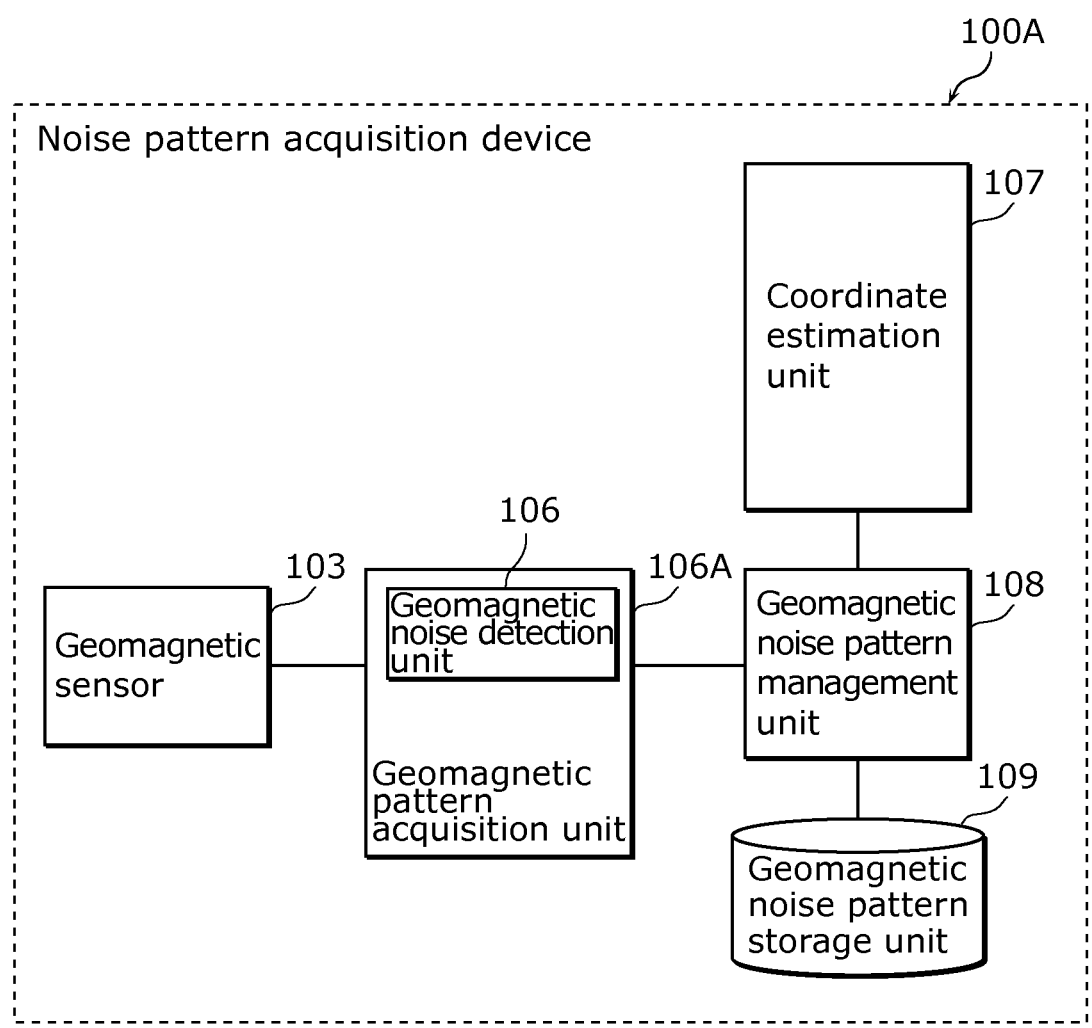
[FIG. 14]
Figure 15:
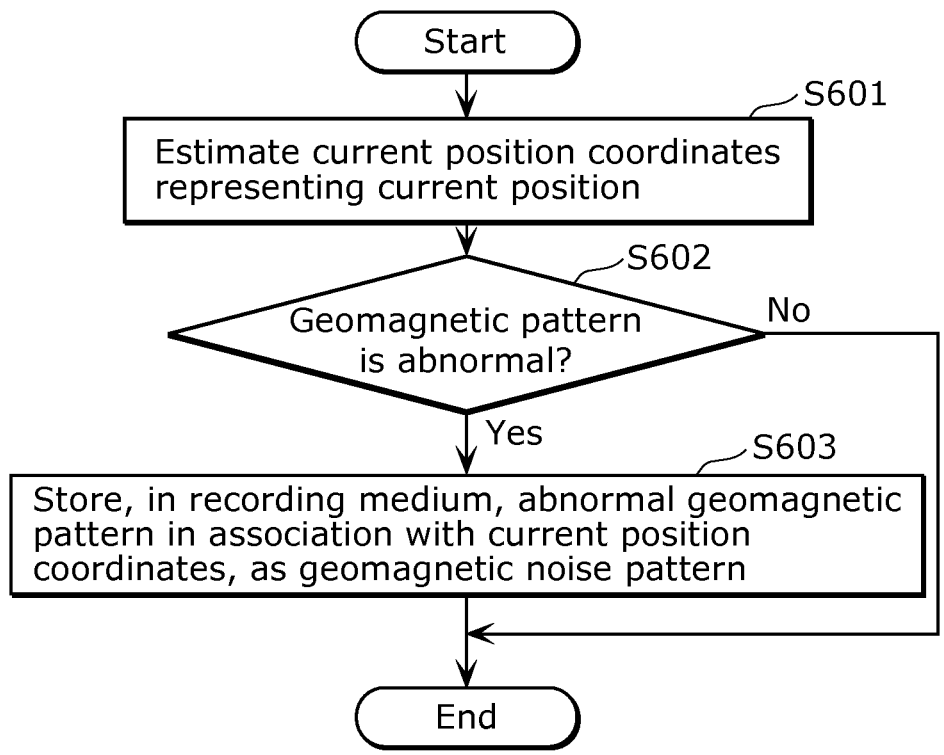
[FIG. 15]

FIG. 14 is a functional block diagram of a noise pattern acquisition device 100A according to Variation 4 of an embodiment of the present invention. FIG. 15 is a flowchart showing flow of a process by the noise pattern acquisition device 100A according to Variation 4 of an embodiment of the present invention.

Though the above describes the case where the position detection apparatus 100 includes the acceleration sensor 101, the angular velocity sensor 102, the geomagnetic sensor 103, the movement amount detection unit 104, the terminal posture detection unit 105, the geomagnetic pattern acquisition unit 106A, the coordinate estimation unit 107, the geomagnetic noise pattern management unit 108, the geomagnetic noise pattern storage unit 109, and the coordinate correction unit 110, the present invention is not limited to this structure. For example, it is sufficient as long as a noise pattern acquisition device 100A is included as the minimum structure of the position detection apparatus 100 as shown in FIG. 14. More specifically, it is sufficient as long as the noise pattern acquisition device 100A includes the geomagnetic sensor 103, the geomagnetic pattern acquisition unit 106A, the coordinate estimation unit 107, the geomagnetic noise pattern management unit 108, and the geomagnetic noise pattern storage unit 109. By including at least the noise pattern acquisition device 100A, the position detection apparatus 100 can acquire a geomagnetic noise pattern to be used for detecting a proper position with a simple structure and process. This is because by using the acquired geomagnetic noise pattern, the position detection apparatus 100 can detect a proper position as described thus far.

More specifically, with the noise pattern acquisition device 100A, the coordinate estimation unit 107 estimates current position coordinates representing a current position of the noise pattern acquisition device. When an abnormality occurs in the magnetic field strength detected by the geomagnetic sensor 103 during movement of the noise pattern acquisition device 100A, for example, the geomagnetic noise pattern management unit 108 stores, in the geomagnetic noise pattern storage unit 109, a geomagnetic noise pattern that is a pattern representing a time-series change of the magnetic field strength detected by the geomagnetic sensor 103, in association with the current position coordinates estimated by the coordinate estimation unit 107 when the abnormality occurs. The other operations are as described above, and thus their descriptions are omitted.

The geomagnetic pattern acquisition unit 106A acquires a geomagnetic pattern that is a pattern representing a time-series change of the magnetic field strength detected by the geomagnetic sensor 103 during movement of the noise pattern acquisition device 100A. For example, the geomagnetic pattern acquisition unit 106A may further include the geomagnetic noise detection unit 106. In that case, the geomagnetic noise detection unit 106 may detect a time period during which the pattern representing the time-series change of the magnetic field strength detected by the geomagnetic sensor 103 during movement of the noise pattern acquisition device 100A is different from a standard pattern, for example, as a time period during which an abnormality occurs in the magnetic field strength. Furthermore, the geomagnetic noise detection unit 106 may detect a time period during which the amount of change in the magnetic field strength of the geomagnetism detected by the geomagnetic sensor 103 is greater than or equal to a predetermined amount, for example, as a time period during which an abnormality occurs in the magnetic field strength.

Note that in this variation, each structural element of the noise pattern acquisition device 100A can be implemented not only in the form of an exclusive hardware product but also in the form of a method which includes, as steps, the processing units included in each structural element. This method is specifically a noise pattern acquisition method to be performed by the noise pattern acquisition device 100A and includes, as shown in FIG. 15, steps of (i) estimating current position coordinates representing a current position of the noise pattern acquisition device 100A (Step S601), and (ii) storing, in a recording medium (the geomagnetic noise pattern storage unit 109), a geomagnetic noise pattern that is a pattern representing a time-series change of the magnetic field strength detected by the geomagnetic sensor 103, in association with the current position coordinates (Step S603), when an abnormality occurs in the magnetic field strength detected by the geomagnetic sensor 103 during movement of the noise pattern acquisition device 100A (Yes in Step S602).

In this variation, each structural element of the noise pattern acquisition device 100A may be implemented through execution of a software program suitable for the structural element. Each structural element may be implemented by means of a program execution unit, such as a CPU or a processor, reading and executing a software program recorded on a recording medium such as a hard disk or a semiconductor memory.

Though the noise pattern acquisition device 100A and the position detection apparatus 100 including the noise pattern acquisition device 100A according to an aspect of the present invention have been described by way of the above embodiment and variations, the present invention is not limited to such. Those skilled in the art will readily appreciate that many modifications can be made to this embodiment and the structural elements of different embodiments can be combined to make another embodiment without materially departing from the novel teachings and advantages of the present invention. Accordingly, all such modifications are intended to be included within the scope of one or more aspects of the present invention.

For example, though the above embodiment and variations describe the case where the position detection apparatus 100 includes the angular velocity sensor 102 and the geomagnetic noise pattern storage unit 109, the position detection apparatus 100 need not include the angular velocity sensor 102 and the geomagnetic noise pattern storage unit 109. In the case where the position detection apparatus 100 does not include the geomagnetic noise pattern storage unit 109, the position detection apparatus 100 may use any of the tables 109a to 109d stored in a recording medium externally connected to the position detection apparatus 100. In the case where the position detection apparatus 100 does not include the angular velocity sensor 102, the terminal posture detection unit 105, upon determining that geomagnetic noise occurs in Step S204 in FIG. 6, estimates the current orientation of the mobile terminal 1000 from the orientation last calculated before the occurrence of the geomagnetic noise, in Step S206. The geomagnetic noise detection unit 106 omits Steps S303 and S304 in FIG. 7 in this case.

Though the above embodiment and variations describe the case where the position detection apparatus 100 includes the acceleration sensor 101, the movement amount detection unit 104, and the terminal posture detection unit 105, the position detection apparatus 100 need not include the acceleration sensor 101, the movement amount detection unit 104, and the terminal posture detection unit 105. In such a case, the position detection apparatus 100 includes a GPS sensor as an example, and the coordinate estimation unit 107 obtains position information from the GPS sensor and estimates the current position coordinates based on the obtained position information. Alternatively, the position detection apparatus 100 includes a wireless LAN communication unit as an example, and the coordinate estimation unit 107 obtains an electric field strength of a radio wave received by the wireless LAN communication unit and estimates the current position coordinates based on the obtained electric field strength.

Though the above embodiment and variations describe the case where, in the case of determining that the reference accuracy is equal to or less than the current position accuracy in Step S405 in FIG. 8, the geomagnetic noise pattern management unit 108 updates the reference accuracy in the table in the geomagnetic noise pattern storage unit 109, the reference accuracy may be updated at other timings. For instance, each time a reference point is passed, the geomagnetic noise pattern management unit 108 may increase reference accuracy corresponding to the reference point. In detail, each time Step S406 is performed for the same reference coordinates, the geomagnetic noise pattern management unit 108 increases the reference accuracy registered in the table in association with the same reference coordinates, by a predetermined level.

Though the above embodiment and variations describe the case where each of the occurring geomagnetic noise pattern and the reference noise pattern is treated as a three-axis (X, Y, and Z axes) pattern, one combined pattern may be used instead.

Though the above embodiment and variations describe the case where the geomagnetic noise detection unit 106 executes each step in the order of the flowchart shown in FIG. 7, Steps S303 and S304 may be performed before Step S302.

Though the above embodiment describes the case where the occurring geomagnetic noise pattern is scaled and Variation 1 describes the case where the reference noise pattern is scaled, any of the patterns may be scaled so long as the occurring geomagnetic noise pattern and the comparison-target reference noise pattern match in scale. For example, both patterns may be scaled.

Note that each structural element in the above embodiment may be configured in the form of an exclusive hardware product or may be implemented through execution of a software program suitable for the structural element. Each structural element may be implemented by means of a program execution unit, such as a CPU or a processor, reading and executing a software program recorded on a recording medium such as a hard disk or a semiconductor memory.

For example, the following cases are also included in the present invention.

(1) Each of the above-mentioned device (apparatus) and terminal is actually a computer system that includes a microprocessor, a ROM, a RAM, a hard disk unit, a display unit, a keyboard, a mouse, and the like. A computer program is stored in the RAM or the hard disk unit. Functions of each device (apparatus) can be achieved by the microprocessor operating in accordance with the computer program. The computer program mentioned here is a combination of a plurality of instruction codes that represent instructions to a computer for achieving predetermined functions.

(2) The components constituting each of the above-mentioned device (apparatus) and terminal may be partly or wholly implemented on one system LSI (Large Scale Integrated Circuit). The system LSI is an ultra-multifunctional LSI produced by integrating a plurality of components on one chip, and is actually a computer system that includes a microprocessor, a ROM, a RAM, and the like. A computer program is stored in the RAM. Functions of the system LSI can be achieved by the microprocessor operating in accordance with the computer program. For example, the integrated circuit includes the movement amount detection unit 104, the terminal posture detection unit 105, the geomagnetic noise detection unit 106, the coordinate estimation unit 107, the geomagnetic noise pattern management unit 108, the geomagnetic noise pattern storage unit 109, and the coordinate correction unit 110.

(3) The components constituting each of the above-mentioned device (apparatus) and terminal may be partly or wholly realized by an IC card or a single module that is removably connectable to the device (apparatus) or terminal. The IC card or the module is a computer system that includes a microprocessor, a ROM, a RAM, and the like. The IC card or the module may include the above-mentioned ultra-multifunctional LSI. Functions of the IC card or the module can be achieved by the microprocessor operating in accordance with the computer program. The IC card or the module may be tamper resistant.

(4) The present invention may also be the method described above. The present invention may also be a computer program that realizes the method by a computer. The present invention may also be a digital signal corresponding to the computer program.

The present invention may also be a computer-readable recording medium, such as a flexible disk, a hard disk, a CD-ROM, an MO, a DVD, a DVD-ROM, a DVD-RAM, a BD (Blu-ray Disc), or a semiconductor memory, on which the computer program or the digital signal is recorded. Conversely, the present invention may be the digital signal recorded on such a recording medium.

The present invention may also be the computer program or the digital signal transmitted via an electric communication line, a wired or wireless communication line, a network such as the Internet, data broadcasting, and the like.

The present invention may also be a computer system that includes a microprocessor and a memory. In this case, the computer program may be stored in the memory, with the microprocessor operating in accordance with the computer program.

The computer program or the digital signal may be provided to another independent computer system by distributing the recording medium on which the computer program or the digital signal is recorded, or by transmitting the computer program or the digital signal via the network and the like. The independent computer system may then execute the computer program or the digital signal to function as the present invention.

(5) The above embodiment and variations may be freely combined.

INDUSTRIAL APPLICABILITY

The noise pattern acquisition device and the position detection apparatus including the noise pattern acquisition device according to the present invention can detect a proper position with a simple structure and process. This contributes to reduced cost. The noise pattern acquisition device and the position detection apparatus including the noise pattern acquisition device are applicable to a mobile terminal configured as a mobile phone, for example.

REFERENCE SIGNS LIST

100 Position detection apparatus
100A Noise pattern acquisition device
101 Acceleration sensor
102 Angular velocity sensor
103 Geomagnetic sensor
104 Movement amount detection unit
105 Terminal posture detection unit
106 Geomagnetic noise detection unit
106A Geomagnetic pattern acquisition unit
107 Coordinate estimation unit
108 Geomagnetic noise pattern management unit
109 Geomagnetic noise pattern storage unit
109a, 109b, 109c, 109d Table
110 Coordinate correction unit
1000 Mobile terminal

The invention claimed is:

1. A noise pattern acquisition device comprising:
a geomagnetic sensor;
a coordinate estimation unit configured to estimate current position coordinates representing a current position of the noise pattern acquisition device; and
a geomagnetic noise pattern management unit configured to, when an abnormality occurs in a magnetic field strength detected by the geomagnetic sensor during movement of the noise pattern acquisition device, store a geomagnetic noise pattern in a recording medium in association with the current position coordinates estimated by the coordinate estimation unit when the abnormality occurs, the geomagnetic noise pattern being a pattern representing a time-series change of the magnetic field strength detected by the geomagnetic sensor, the time-series change of the magnetic field strength being caused by the movement of the noise pattern acquisition device.

2. The noise pattern acquisition device according to claim 1, further comprising a geomagnetic noise detection unit configured to detect a time period during which the pattern representing the time-series change of the magnetic field strength detected by the geomagnetic sensor during movement of the noise pattern acquisition device is different from a standard pattern, as a time period during which an abnormality occurs in the magnetic field strength, the time-series change of the magnetic field strength being caused by the movement of the noise pattern acquisition device.

3. The noise pattern acquisition device according to claim 1, further comprising a geomagnetic noise detection unit configured to detect a time period during which an amount of change in the magnetic field strength of geomagnetism detected by the geomagnetic sensor is greater than or equal to a predetermined amount, as a time period during which an abnormality occurs in the magnetic field strength.

4. The noise pattern acquisition device according to claim 1, further comprising
a geomagnetic pattern acquisition unit configured to acquire a geomagnetic pattern that is a pattern representing a time-series change of the magnetic field strength detected by the geomagnetic sensor during movement of the noise pattern acquisition device, the time-series change of the magnetic field strength being caused by the movement of the noise pattern acquisition device.

5. The noise pattern acquisition device according to claim 1,
wherein the geomagnetic noise pattern management unit is configured to:
search the recording medium in which one or more patterns are stored, for a correction reference noise pattern that is (i) associated with coordinates near processing-target current position coordinates estimated by the coordinate estimation unit when the abnormality occurs and (ii) similar to the geomagnetic noise pattern, the processing-target current position coordinates being the current position coordinates to be processed;
store the processing-target current position coordinates and the geomagnetic noise pattern in the recording medium in association with each other when the correction reference noise pattern is not found through the search; and
instruct correction of the processing-target current position coordinates when the correction reference noise pattern is found through the search, and
the noise pattern acquisition device further comprises
a coordinate correction unit configured to correct the processing-target current position coordinates to coordinates stored in the recording medium in association with the correction reference noise pattern, according to the correction instruction by the geomagnetic noise pattern management unit.

6. A position detection apparatus comprising
the noise pattern acquisition device according to claim 5,
wherein the position detection apparatus detects a position of the position detection apparatus after movement as the current position coordinates, by estimating coordinates indicating the position of the position detection apparatus after movement.

7. The position detection apparatus according to claim 6, further comprising:
an acceleration sensor;
a posture detection unit configured to detect a posture of the position detection apparatus based on detection results of the acceleration sensor and the geomagnetic sensor; and
a movement amount detection unit configured to detect a movement amount indicating a movement direction and a movement distance of the position detection apparatus, based on the posture detected by the posture detection unit and the detection result of the acceleration sensor,
wherein the coordinate estimation unit is configured to estimate, as the current position coordinates, coordinates away from previously estimated coordinates by the movement amount detected by the movement amount detection unit.

8. The position detection apparatus according to claim 6, further comprising
an angular velocity sensor,
wherein the geomagnetic noise detection unit is configured to detect whether or not an abnormality occurs in geomagnetic detection, by comparing an amount of change in orientation of the position detection apparatus detected by the angular velocity sensor and an amount of change in orientation of the position detection apparatus derived based on a change in the magnetic field strength detected by the geomagnetic sensor.

9. The position detection apparatus according to claim 7,
wherein the movement amount detection unit is configured to further detect a movement velocity of the position detection apparatus based on the detection result of the acceleration sensor,
when searching for the correction reference noise pattern, the geomagnetic noise pattern management unit is configured to (i) scale a comparison-target pattern stored in the recording medium, according to a ratio between a movement velocity stored in the recording medium in association with the comparison-target pattern and the movement velocity detected by the movement amount detection unit when the abnormality occurs, to match a time-axis scale of the comparison-target pattern with a time-axis scale of the geomagnetic noise pattern, and (ii) perform pattern matching between the geomagnetic noise pattern and the scaled comparison-target pattern to determine whether or not the comparison-target pattern is the correction reference noise pattern, the comparison-target pattern being a pattern to be compared with the geomagnetic noise pattern, and
when the correction reference noise pattern is not found through the search, the geomagnetic noise pattern management unit is configured to store the movement velocity detected by the movement amount detection unit when the abnormality occurs, in the recording medium in association with the processing-target current position coordinates and the geomagnetic noise pattern.

10. The position detection apparatus according to claim 7,
wherein the movement amount detection unit is configured to further detect a movement velocity of the position detection apparatus based on the detection result of the acceleration sensor,
when searching for the correction reference noise pattern, the geomagnetic noise pattern management unit is configured to (i) scale the geomagnetic noise pattern according to a ratio between a predetermined movement velocity and the movement velocity detected by the movement amount detection unit when the abnormality occurs, to match a time-axis scale of the geomagnetic noise pattern with a time-axis scale of a comparison-target pattern stored in the recording medium, and (ii) perform pattern matching between the scaled geomagnetic noise pattern and the comparison-target pattern to determine whether or not the comparison-target pattern is the correction reference noise pattern, the comparison-target pattern being a pattern to be compared with the geomagnetic noise pattern, and
when the correction reference noise pattern is not found through the search, the geomagnetic noise pattern management unit is configured to store the scaled geomagnetic noise pattern in the recording medium.

11. The position detection apparatus according to claim 6,
wherein the coordinate estimation unit is further configured to calculate current position accuracy indicating accuracy of the current position coordinates, according to at least one of: a distance of movement of the position detection apparatus from coordinates of a reference point; complexity of the movement of the position detection apparatus from the coordinates of the reference point; and a time period required for the movement of the position detection apparatus from the coordinates of the reference point, the reference point being a point by which the position detection apparatus has most recently passed and whose position is already identified, when the correction reference noise pattern is not found through the search, the geomagnetic noise pattern management unit is configured to store current position accuracy calculated for the processing-target current position coordinates, in the recording medium in association with the processing-target current position coordinates and the geomagnetic noise pattern, and when the correction reference noise pattern is found through the search, the geomagnetic noise pattern management unit is configured to (i) compare the current position accuracy calculated for the processing-target current position coordinates and accuracy stored in the recording medium in association with the correction reference noise pattern, and (ii) instruct the coordinate correction unit to correct the processing-target current position coordinates when the accuracy stored in the recording medium is higher than the current position accuracy.

12. The position detection apparatus according to claim 11, wherein the geomagnetic noise pattern management unit is configured to replace the coordinates and the accuracy stored in the recording medium in association with the correction reference noise pattern, with the processing-target current position coordinates and the current position accuracy, respectively, when the accuracy stored in the recording medium is equal to or lower than the current position accuracy.

13. The position detection apparatus according to claim 6, wherein the geomagnetic noise pattern management unit is configured to search for the correction reference noise pattern based on (i) a similarity between each of one or more patterns stored in the recording medium and the geomagnetic noise pattern and (ii) a distance between each set of the coordinates stored in the recording medium in association with the one or more patterns and the processing-target current position coordinates.

14. The position detection apparatus according to claim 6, wherein when the correction reference noise pattern is found through the search, the geomagnetic noise pattern management unit is configured to store the geomagnetic noise pattern in the recording medium to associate the correction reference noise pattern and the geomagnetic noise pattern with same coordinates, and when the geomagnetic noise detection unit detects a next geomagnetic noise pattern, the geomagnetic noise pattern management unit is configured to search the recording medium in which plural patterns are stored, for a correction reference noise pattern corresponding to the next geomagnetic noise pattern, the plural patterns including the correction reference noise pattern and the geomagnetic noise pattern which are associated with the same coordinates.

15. The position detection apparatus according to claim 6, wherein when searching for the correction reference noise pattern, the geomagnetic noise pattern management unit is configured to specify a type of the geomagnetic noise pattern, and when the specified type indicates that the magnetic field strength is disturbed, search for a pattern stored in the recording medium in association with the type indicating the disturbance, as the correction reference noise pattern, and when the correction reference noise pattern is not found through the search, the geomagnetic noise pattern management unit is configured to store the type indicating the disturbance in the recording medium in association with the processing-target current position coordinates and the geomagnetic noise pattern.

16. A noise pattern acquisition method to be performed by a noise pattern acquisition device, the method comprising:
estimating current position coordinates representing a current position of the noise pattern acquisition device; and
when an abnormality occurs in a magnetic field strength detected by a geomagnetic sensor during movement of the noise pattern acquisition device, storing, in a recording medium, a geomagnetic noise pattern which is a pattern representing a time-series change of the magnetic field strength detected by the geomagnetic sensor, the time-series change of the magnetic field strength being caused by the movement of the noise pattern acquisition device.

17. A non-transitory computer-readable recording medium for use in a computer, the recording medium having a computer program recorded thereon for causing the computer to acquire a noise pattern, the computer program causing the computer to execute:
estimating current position coordinates representing a current position of a noise pattern acquisition device; and
when an abnormality occurs in a magnetic field strength detected by a geomagnetic sensor during movement of the noise pattern acquisition device, storing, in a recording medium, a geomagnetic noise pattern which is a pattern representing a time-series change of the magnetic field strength detected by the geomagnetic sensor, the time-series change of the magnetic field strength being caused by the movement of the noise pattern acquisition device.

18. An integrated circuit comprising:
a coordinate estimation unit configured to estimate current position coordinates representing a current position of a noise pattern acquisition device; and
a geomagnetic noise pattern management unit configured to, when an abnormality occurs in a magnetic field strength detected by a geomagnetic sensor during movement of the noise pattern acquisition device, store, in a recording medium, a geomagnetic noise pattern which is a pattern representing a time-series change of the magnetic field strength detected by the geomagnetic sensor, the time-series change of the magnetic field strength being caused by the movement of the noise pattern acquisition device.

* * * * *